(12) United States Patent
Umenaga

(10) Patent No.: US 8,570,603 B2
(45) Date of Patent: Oct. 29, 2013

(54) PRINT JOB MANAGEMENT SYSTEM FOR MANAGING PROHIBITION INFORMATION

(75) Inventor: Akihiro Umenaga, Osaka (JP)

(73) Assignee: Kyocera Mita Corporation (JP)

( * ) Notice: Subject to any disclaimer, the term of this patent is extended or adjusted under 35 U.S.C. 154(b) by 253 days.

(21) Appl. No.: 12/953,616

(22) Filed: Nov. 24, 2010

(65) Prior Publication Data
US 2011/0128578 A1  Jun. 2, 2011

(30) Foreign Application Priority Data

| Nov. 30, 2009 | (JP) | 2009-272789 |
| Nov. 30, 2009 | (JP) | 2009-272790 |
| Nov. 30, 2009 | (JP) | 2009-272791 |

(51) Int. Cl.
*G06F 3/12* (2006.01)

(52) U.S. Cl.
USPC ................................ 358/3.15; 358/3.16

(58) Field of Classification Search
None
See application file for complete search history.

(56) References Cited

U.S. PATENT DOCUMENTS

| 2006/0044608 A1 | 3/2006 | Harada |
| 2006/0082802 A1 | 4/2006 | Furuya |
| 2008/0180699 A1* | 7/2008 | Selvaraj ........................ 358/1.1 |
| 2009/0199109 A1* | 8/2009 | Doui ............................. 715/750 |
| 2009/0201531 A1* | 8/2009 | Pandit et al. ................ 358/1.15 |
| 2009/0201540 A1 | 8/2009 | Morooka |
| 2010/0290085 A1* | 11/2010 | Okada et al. ................ 358/1.15 |

FOREIGN PATENT DOCUMENTS

| JP | 2003280864 | 10/2003 |
| JP | 2006119542 | 5/2006 |
| JP | 2008-302546 | 12/2008 |

* cited by examiner

*Primary Examiner* — Qian Yang
*Assistant Examiner* — Michael Y Tzeng
(74) *Attorney, Agent, or Firm* — Gerald E. Hespos; Michael J. Porco; Matthew T. Hespos

(57) ABSTRACT

In a job management system, a PC includes a job reception section for receiving setting of a job from a user and a job transmitting section for transmitting the job to a multifunction peripheral. The multifunction peripheral includes a job receiving section for receiving a job from the PC, a prohibition determining section for determining whether a combination of functions constituting the job is a target of a prohibition process, a controlling section for executing the job, and a prohibition information transmitting section for transmitting prohibition information indicating that the combination of functions constituting the job is the target of the prohibition process to the PC when the combination of functions is the target of the prohibition process. The PC further includes a prohibition information receiving section for receiving the prohibition information from the multifunction peripheral and a prohibition information storage for storing the prohibition information.

7 Claims, 21 Drawing Sheets

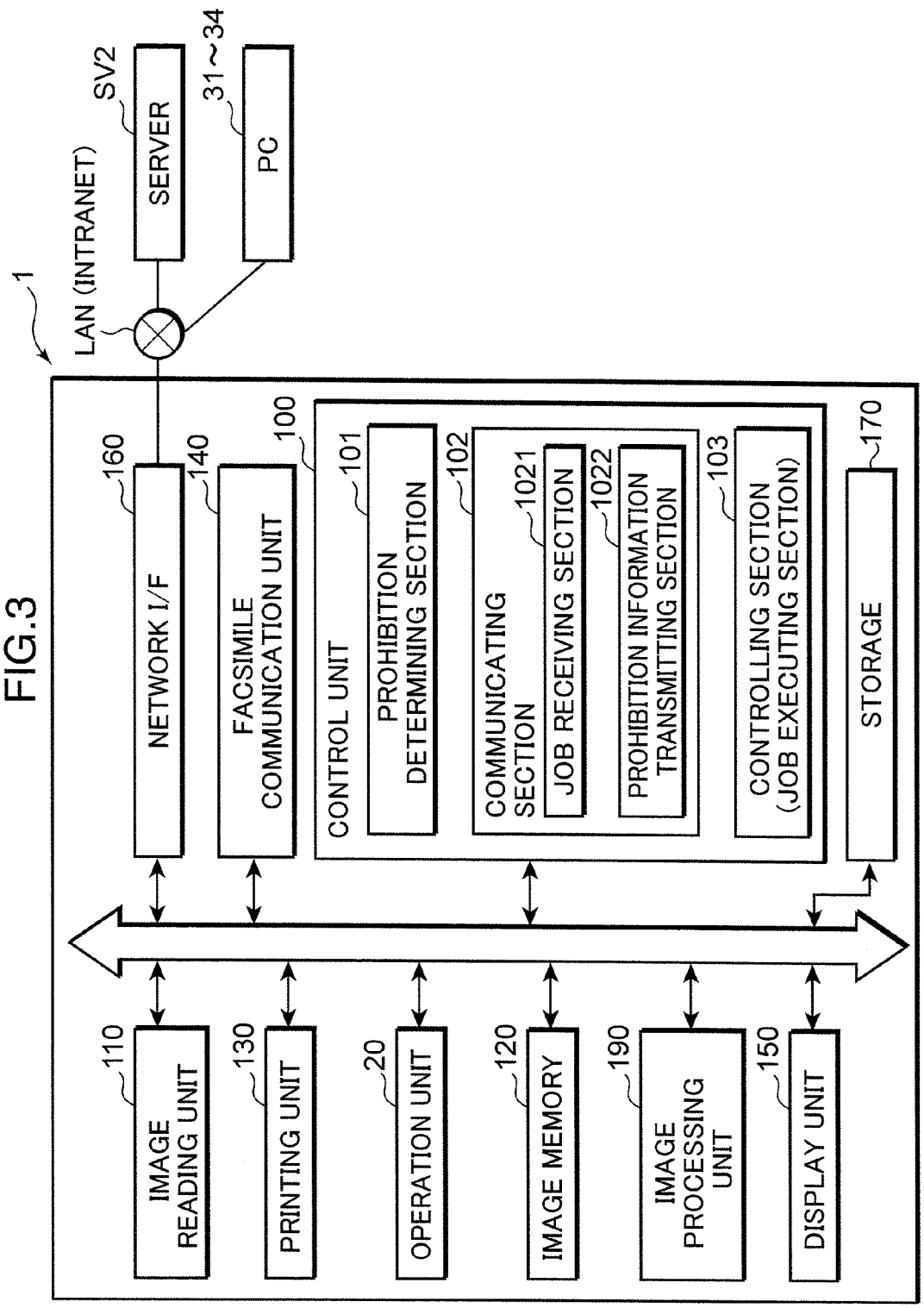

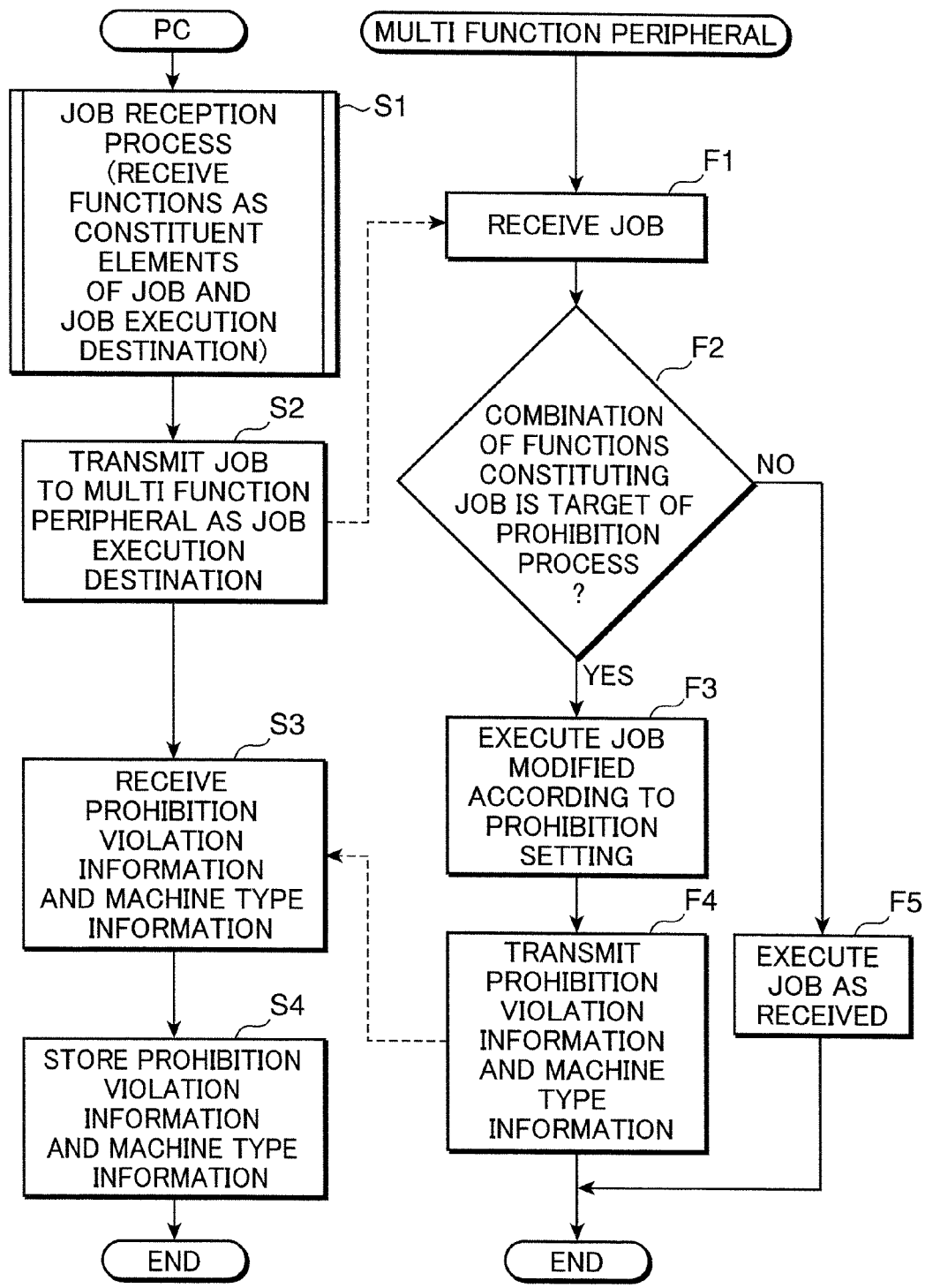

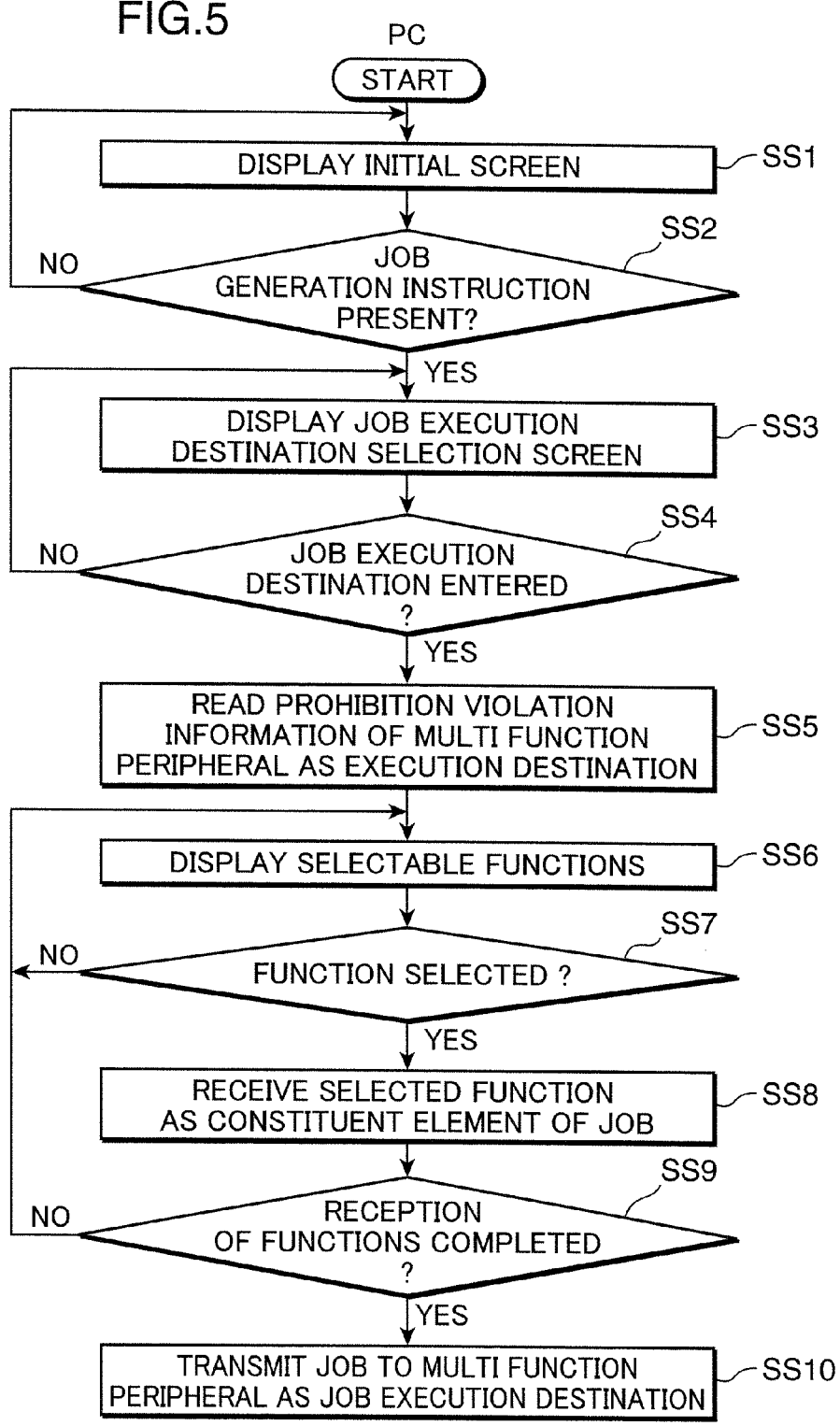

PRINT JOB MANAGEMENT SYSTEM FOR MANAGING PROHIBITION INFORMATION

BACKGROUND OF THE INVENTION

1. Field of the Invention

The present invention relates to a job management system, a readable storage medium storing a job management program and an electric apparatus and particularly to a technology when a computer causes an electric apparatus connected to the computer to execute a job composed of a combination of a plurality of functions.

2. Description of the Related Art

In an electric apparatus such as an image forming apparatus capable of executing a job composed of a combination of a plurality of functions, a user conventionally sets a job by operating an operation panel to combine a plurality of functions. In such an image forming apparatus, setting of a prohibition process indicating a relationship of functions that cannot be combined is stored for combinations of a plurality of functions constituting jobs (e.g. a mixed document function and a page aggregate function cannot be combined at the time of a copying operation) and a technology is employed to enable the user to recognize a combination of which functions is impossible by making a corresponding display on a display unit of the operation panel when the user sets a job by operating the operation panel of the image forming apparatus to combine a plurality of functions.

SUMMARY OF THE INVENTION

The present invention is a further improvement of the above prior art.

Specifically, the present invention is directed to an electric apparatus, comprising a job receiving section for receiving a job transmitted to a computer connected to the electric apparatus; a prohibition determining section for determining whether or not a combination of a plurality of functions indicated by the job received by the job receiving section is a target of a prohibition process stored beforehand; a job executing section for executing the received job; and a prohibition information transmitting section for transmitting prohibition information indicating that the combination of the plurality of functions constituting the job is the target of the prohibition process to the computer when the received job is the target of the prohibition process.

These and other objects, features and advantages of the present invention will become more apparent upon reading the following detailed description along with the accompanying drawings.

BRIEF DESCRIPTION OF THE DRAWINGS

FIG. 3 is a block diagram schematically showing an internal construction of a multi function peripheral.

FIG. 4 is a flow chart showing a job management process by the job management system.

FIG. 5 is a flow chart showing a job entry reception process in the PC or the like of the job management system according to the first embodiment.

DETAILED DESCRIPTION OF THE PREFERRED EMBODIMENTS

Hereinafter, a job management system, a job management program, a computer-readable storage medium storing the job management program, a prohibition determination program, a computer-readable storage medium storing the prohibition determination program, a computer and an electric apparatus according to embodiments of the present invention are described with reference to the drawings.

[First Embodiment]

Figure 1:
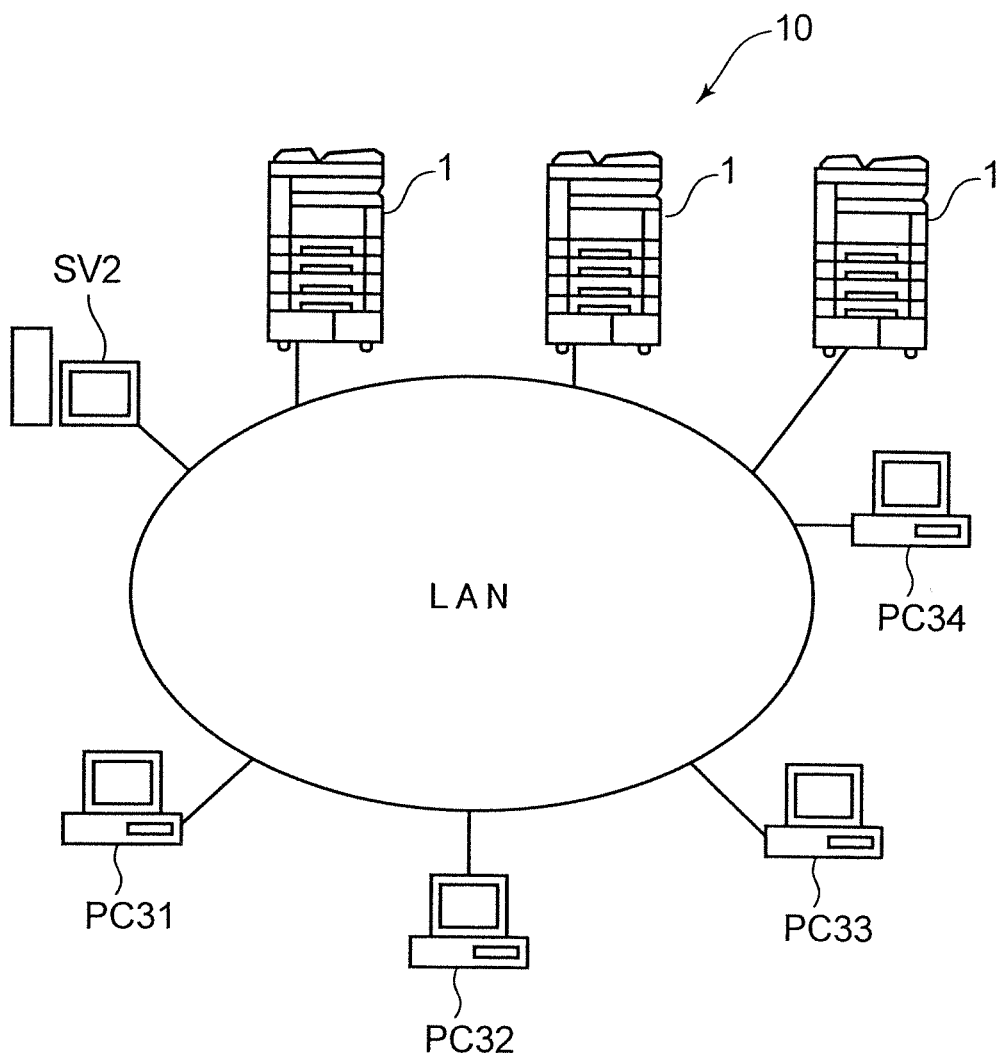
FIG. 1 is a diagram showing a network configuration of image forming apparatuses, a server and computers constituting a first embodiment of a job management system according to the invention.

FIG. 1 is a diagram showing a network configuration of image forming apparatuses (an example of an electrical apparatus), a server and computers constituting a first embodiment of a job management system according to the present invention.

A job management system 10 includes a server (an example of a computer), client computers (an example of the computer) and image forming apparatuses connected to each other by a network such as a LAN (Local Area Network). In this embodiment, the job management system 10 includes one server and four client computers as computers according to one embodiment of the present invention, and three multi function peripherals. However, it is not intended to restrict the numbers of computers and image forming apparatuses provided in a job management system according to the present invention to these.

The multi function peripheral 1 according to one embodiment of the image forming apparatus has a copy function, a facsimile function, a printer function, a scanner function and other functions. The multi function peripheral 1 stores a document data read by an image reader including a scanner in an internal storage device of the multi function peripheral 1 or storages in the server SV2 and the respective client computers (hereinafter, PCs) 31 to 34 connected to the multi function peripheral 1 by Internet or the like. Further, the multi function peripheral 1 prints out a data stored in the internal storage device of the multi function peripheral 1 or data transmitted from the server SV2 and the PCs 31 to 34. The multi function peripheral 1, the server SV2 and the respective PCs 31 to 34 are capable of data communication with each other. The multi function peripheral 1 has a function of receiving jobs transmitted from the server SV2 and the respective PCs 31 to 34 and executing these jobs.

Figure 2:
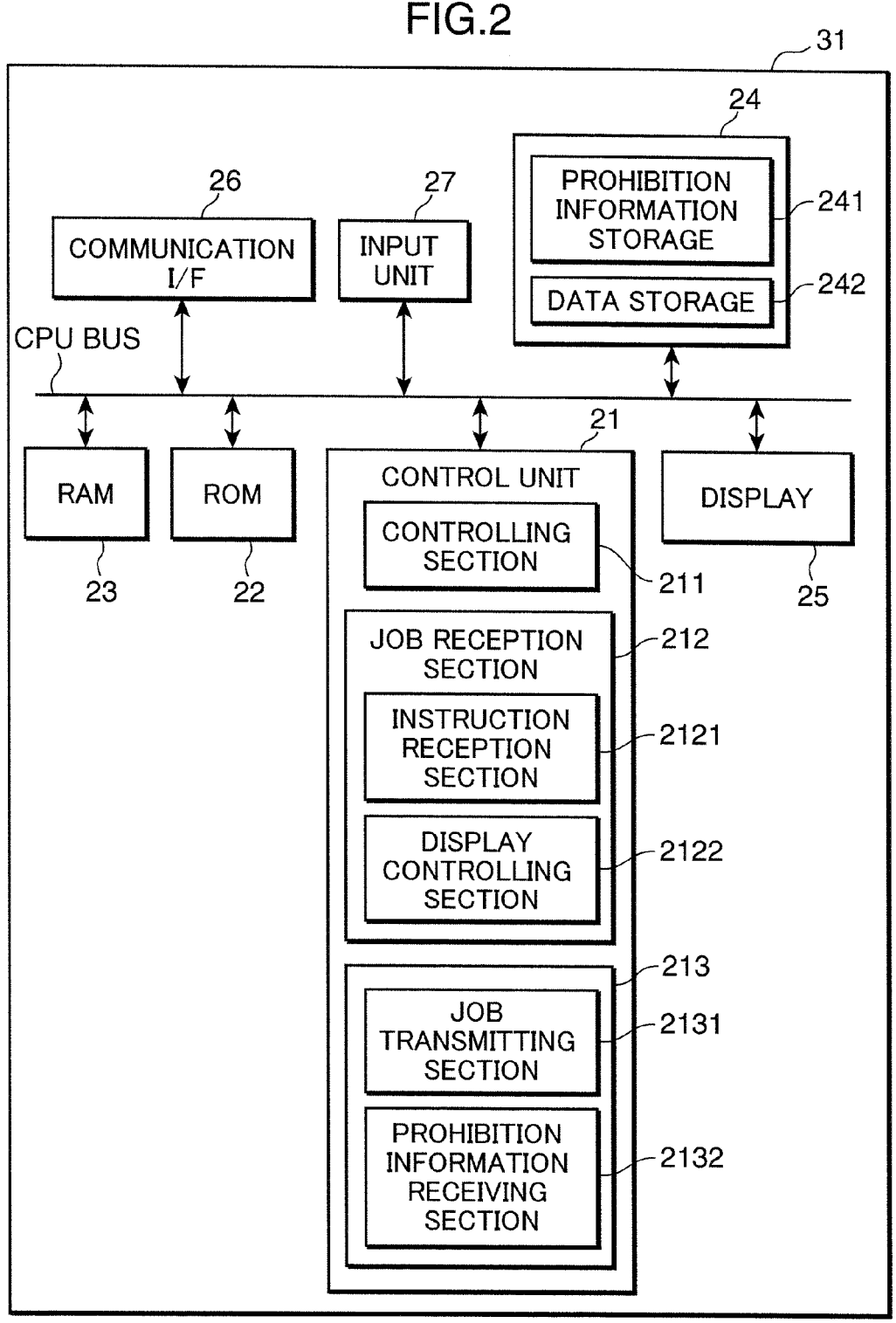
FIG. 2 is a block diagram schematically showing an internal construction of a PC.

FIG. 2 is a block diagram schematically showing an internal construction of the PC 31. Since a necessary construction is similar in the sever SV2 and the PCs 31 to 34 in the present invention, the PC 31 is described below as an example. The PC 31 includes a control unit 21, a ROM 22, a RAM 23, an HDD 24, a display 25, a communication I/F and an input unit 27. These respective parts are capable of transmitting and receiving data or signals to and from each other via a CPU bus.

The control unit 21 includes a CPU and is responsible for an operation control of the entire PC 31. The ROM 22 stores an operation program for operations of the PC 31. The RAM 23 is used as an operating area of a controlling section 211.

A part of a storage area of the HDD 24 functions as a prohibition information storage 241 storing prohibition information (described in detail later) transmitted from the multi function peripheral 1 and another part thereof functions as a data storage 242 storing various data such as document data and image data to be printed. The job management program according to one embodiment of the present invention is stored in the HDD 24. The control unit 21 functions as a job reception section 212 and a data transmitting/receiving section 213 to be described later and also as the controlling section 211 for performing operations necessary for a job management process by these sections by operating in accordance with this job management program. Note that the job management program according to one embodiment of the present invention is stored in a computer readable storage medium and read from this storage medium and stored in the HDD 24 via an unillustrated interface. However, the constructions of the controlling section 211, the job reception section 212 and the data transmitting/receiving section 213 of the control unit 21 are not limited to these, and the controlling section 211, the job reception section 212 and the data transmitting/receiving section 213 may be respectively constructed by hardware circuits. These hold for the respective embodiments unless otherwise mentioned.

The display (notifying section, displaying section) 25 includes an LCD (Liquid Crystal Display) and the like and displays contents of various data, operation guidance for a user operating this PC 31 and the like. The communication I/F 26 functions as an interface for data communication with the multi function peripherals 1 and the server SV2. The input unit 27 includes a keyboard, a mouse and the like, and a job for the multi function peripheral 1 is entered by the user. For example, a combination of functions such as designation of data to be printed from data stored in the data storage 242 of the HDD 24, designation of a recording sheet, designation of a method for processing an image to be printed and an instruction to execute a printing operation is entered as a print job in the input unit 24 by the user. Further, a combination of functions such as document size, document setting, document reading resolution, file format, color/black and white printing, instruction to execute a copying operation is entered by the user. Note that it is not intended to limit types of jobs received by the input unit 27 from users to these.

The control unit 21 includes the controlling section 211, the job reception section 212 and the data transmitting/receiving section 213.

The controlling section 211 is responsible for the operation control of the entire PC 31. The job reception section 212 receives respective jobs entered in the input unit 27 by users. Each job is composed of a combination of a plurality of functions, examples of which are given above. The job reception section 212 includes a display controlling section 2122 and an instruction reception section 2121. The display controlling section 2122 is responsible for a display control of the display 25 and causes the display 25 to display guidance prompting a user to enter a combination of a plurality of functions at the time of generating a job. The instruction reception section 2121 receives a combination of a plurality of functions as elements constituting the job from the user through the operation of the input unit 27 based on the guidance displayed on the display 25.

The data transmitting/receiving section 213 transmits and receives various data such as data to be printed and job execution instructions between the server SV2 and the multi function peripherals 1. The data transmitting/receiving section 213 includes a job transmitting section 2131 and a prohibition information receiving section 2132. The job transmitting section 2131 transmits the job, whose setting was received by the job reception section 212, to the multi function peripheral 1. The prohibition information receiving section 2132 is in charge of a process of receiving the prohibition information from the multi function peripheral 1. This prohibition information is information indicating a combination of a plurality of functions constituting a job and as a target of a prohibition process stored in the multi function peripheral 1 beforehand.

FIG. 3 is a block diagram schematically showing an internal construction of the multi function peripheral 1. The respective multi function peripherals 1 provided in the job management system 10 have similar constructions. Each multi function peripheral 1 includes a control unit (information processing unit) 100 for controlling operations of respective parts of the machine, an image reader 110 including a scanner for reading a document image, an image memory 120 adapted to temporarily store data of documents read by the image reader 110 and serving as a temporary storage area for data to be printed in a printing unit 130, and the printing unit 130 for printing data of documents read by the image reader 110, data transmitted from the server SV2 and other data.

The multi function peripheral 1 includes a facsimile communication unit 140 for executing various functions necessary for facsimile communication and receiving an image data from an external facsimile machine via a public line, an operation unit 20 including a print or transmit start key, a numeric pad and abbreviated number keys, etc. and adapted to receive inputs such as various operation instructions (print setting input, instruction to print on a set sheet, etc.) from an operator, and a display unit 150 including an LCD (Liquid Crystal Display) for displaying operation guidance and the like for the operator. Note that this display unit 150 may receive various operation instructions from the operator using a touch panel function.

The multi function peripheral 1 further includes an HDD (hard disk) 24 having a large-capacity storage area storing document image data read by the image reader 110 and the like. The document image data read by the image reader 110 and data transmitted from the server SV2 or the PCs 31 to 34 are accumulated in this HDD24.

The control unit 100 is composed of a CPU and responsible for the overall operation of the multi function peripheral 1. The control unit 100 includes a prohibition determining section 101, a communicating section 102 and a controlling section 103.

The prohibition determining section 101 determines whether or not a combination of a plurality of functions constituting a job received from the PC 31 or the like by a job receiving section 1021 of the communicating section 102 is a target of a prohibition process based on prohibition setting stored beforehand. This prohibition setting is predetermined information indicating a relationship of functions that cannot be combined for a combination of a plurality of functions constituting a job (e.g. a mixed document function and a page aggregate function cannot be combined at the time of a copying operation). However, it is not intended to limit the prohibition setting and the prohibition process to this example. Note that the prohibition setting is set for each type of the multi function peripheral 1 and each multi function peripheral 1 stores the prohibition setting corresponding to its type in the prohibition determining section 101.

The communicating section 102 performs processes necessary for data transmission and reception to and from the server SV2 and the PCs 31 to 34. The communicating section 102 includes the job receiving section 1021 and a prohibition information transmitting section 1022. The job receiving section 1021 receives a job transmitted from the PC 31 or the like via a network I/F unit 160. The prohibition information transmitting section 1022 transmits prohibition information indicating that the combination of the plurality of functions constituting the job is a target of the prohibition process to the PC 31 or the like, if the job received from the PC 31 or the like by the job receiving section 1021 is determined to be the target of the prohibition process in the prohibition determining section 101.

The controlling section (job executing section) 103 is responsible for an operation control of the entire multi function peripheral 1. In this embodiment, the controlling section 103 controls operations of respective operational mechanisms of the multi function peripheral 1 in accordance with the job received from the PC 31 or the like by the job receiving section 1021 to cause the respective operational mechanisms of the multi function peripheral 1 to perform a printing operation, a copying operation or the like indicated by this job.

The multi function peripheral 1 further includes an image processing unit 190 for editing/processing (encoding/decoding, size enlargement/reduction, compression/expansion) an image data read by the image reader 110, and the network I/F unit 160 used for communication of various data with the server SV2 and the PCs 31 to 34.

A prohibition determination program according to one embodiment of the present invention is stored in the above HDD24. The control unit 100 functions as the prohibition determining section 101 and the communicating section 102 (job receiving section 1021 and prohibition information transmitting section 1022) and further as the controlling section 103 for performing processings necessary for the job management process by these respective sections by operating in accordance with the prohibition determination program. Note that the prohibition determination program according to one embodiment of the present invention is stored in a computer-readable storage medium, read from the storage medium and stored in the HDD 24 via an unillustrated interface. However, the constructions of the prohibition determining section 101, the communicating section 102 and the controlling section 103 of the control unit 100 are not limited to these, and the prohibition determining section 101, the communicating section 102 and the controlling section 103 may be respectively constructed by hardware circuits. These hold for the respective embodiments unless otherwise mentioned.

Next, the job management process by the job management system 10 according to the first embodiment is described. FIG. 4 is a flow chart showing the job management process by the job management system 10.

In this job management system 10, when a job of the multi function peripheral 1 is entered by a user in the server SV2 or the PC 31 to 34, this job is transmitted form the server SV2 or the PC 31 to 34 to the multi function peripheral 1 designated as an execution destination of the entered job by the user, and the multi function peripheral 1 having received this job executes the received job. Hereinafter, this job management process is described for an exemplary case where the job is transmitted to the multi function peripheral 1 from the PC 31.

When the user operates the PC 31 to enter the job for the multi function peripheral 1 and this job is received by the PC 31 (S1: job reception process is described in detail later), the job transmitting section 2131 of the PC 31 transmits this job to the multi function peripheral 1 designated as the execution destination of this job by the user (S2).

In the multi function peripheral 1, when the job receiving section 1021 of the communicating section 102 receives the above job (F1), the prohibition determining section 101 determines whether or not a combination of a plurality of functions constituting this job is a target of the prohibition process based on the prohibition setting stored beforehand (F2). As described above, this prohibition setting is predetermined information indicating a relationship of combinations of functions that cannot be executed in the multi function peripheral 1 for combinations of a plurality of functions constituting jobs.

If the prohibition determining section 101 determines that the combination of the plurality of functions is not the target of the prohibition process stored beforehand (NO in F2), the controlling section 103 executes this job as the respective functions constituting this job are combined (F5). In other words, the controlling section 103 causes the respective operational mechanisms of the multi function peripheral 1 to execute the plurality of functions constituting this job in accordance with the received job.

On the other hand, if the prohibition determining section 101 determines that the combination of the plurality of functions is the target of the prohibition process stored beforehand (YES in F2), the controlling section 103 deletes the functions as the target of the prohibition process from the respective functions constituting this job or replaces such functions with those that do not violate the prohibition setting and then executes the modified job (F3). In place of the processing in F3, the controlling section 103 may not execute this job in F3 if the prohibition determining section 101 determines that the combination of the plurality of functions is the target of the prohibition process stored beforehand (YES in F2).

The prohibition information transmitting section 1022 transmits the prohibition information indicating that the combination of the plurality of functions constituting the job received by the job receiving section 1021 is the target of the prohibition process and machine type information indicating the type of the multi function peripheral 1 itself to the PC 31, which transmitted this job (F4).

When the prohibition information and the machine type information transmitted from the multi function peripheral 1 are received by the prohibition information receiving section 2132 in PC 31 (S3), the prohibition information receiving section 2132 stores the received prohibition information and machine type information in the prohibition information storage 241 (S4).

Since the PC 31 can utilize the prohibition information stored in the prohibition information storage 241 according to this embodiment, it becomes possible to let the user operating the PC 31 grasp functions, which cannot be combined, for example, by notifying such functions at the time of generating a job.

Although the prohibition information transmitting section 1022 of the multi function peripheral 1 transmits the prohibition information and the machine type information to the PC 31 (F4) in the above example, it may transmit the prohibition information to the PC 31 without transmitting the machine type information, for example, if one multi function peripheral 1 is provided in the job management system 10.

Next, a job entry reception process in the PC 31 and the like of the job management system 10 according to the first embodiment is described. FIG. 5 is a flow chart showing the job entry reception process in the PC 31 and the like of the job management system 10 according to the first embodiment.

Figure 6A:
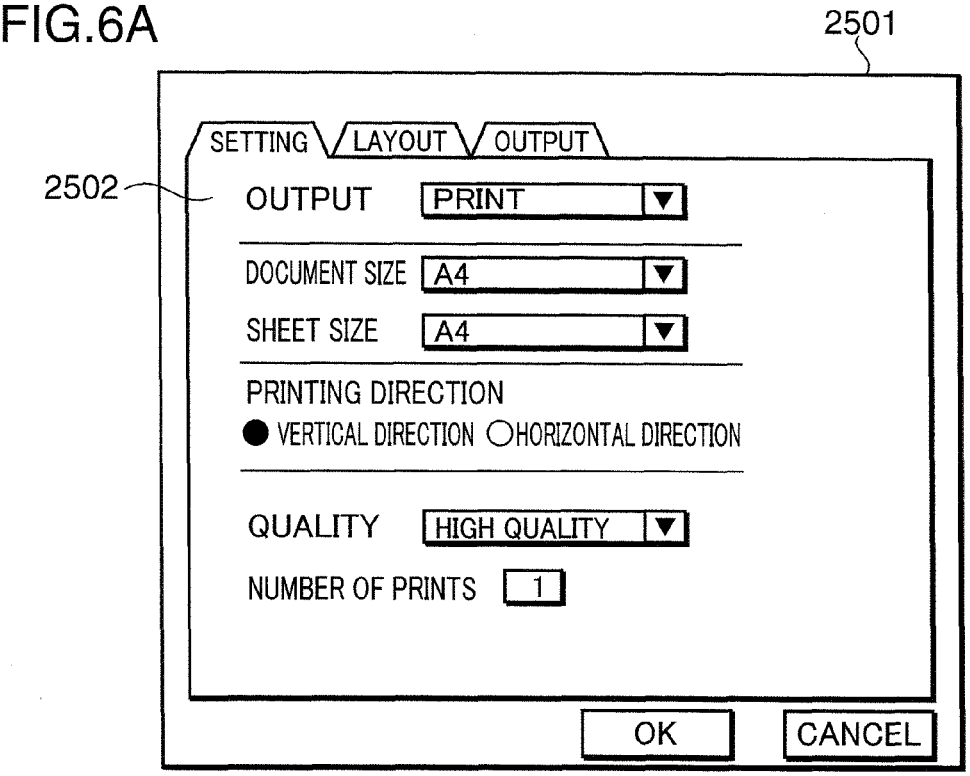
FIGS. 6A and 6B are diagrams showing examples of a driver initial screen.
Figure 6B:
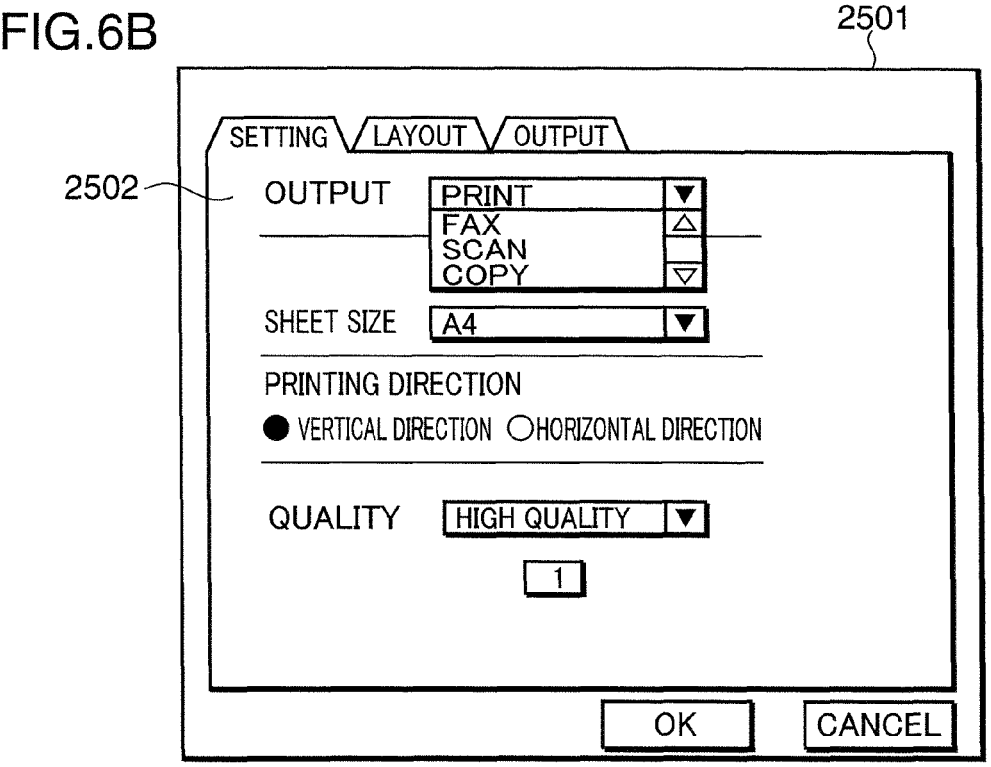

When an instruction to start a driver of the multi function peripheral 1 is input through the operation of the input unit 27 in the PC 31 by the user, the display controlling section 2122 causes the display 25 to display a driver initial screen (SS1). This driver initial screen is, for example, the one shown in FIG. 6A. An "OUTPUT" field 2502 is displayed on the driver initial screen 2501 to receive selection as to which of a copying operation, a printing operation, a scanning operation and a facsimile operation is to be executed from the user. The respective selectable operations (copy, print, scan, fax) are displayed in a laterally long bar of this field 2502. By pressing a "▼" mark displayed at an end of the laterally long bar through a mouse pointer operation or the like, all the selectable operations are pull-down displayed as shown in FIG. 6B. If the user selects a display part of a desired operation through a mouse pointer operation with all the selectable operations displayed in this way, a job generation instruction for the selected operation is received by the display controlling section 2122 (YES in SS2) and the display controlling section 2122 causes a display of a job execution destination selection screen 2503 of the multi function peripheral 1 as a job execution destination, for example, as shown in FIG. 7 (SS3).

Figure 7:
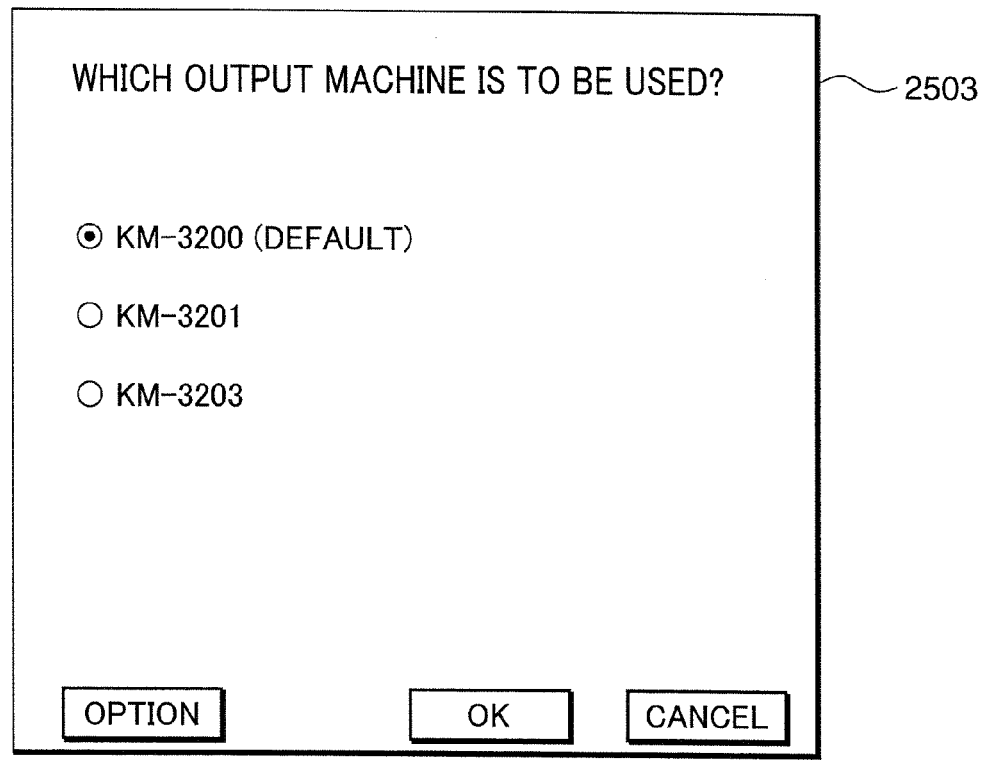
FIG. 7 is a diagram showing an example of a job execution destination selection screen.

In an example of FIG. 7, the respective multi function peripherals 1 provided in the job management system 10 and registered as output apparatuses in the PC 31 are displayed on this job execution destination selection screen 2503. When any one of radio button display parts of the respective multi function peripherals 1 is selected through a mouse pointer operation or the like by a user, selection of the multi function peripheral 1 as a job execution destination is received by the instruction reception section 2121.

When selection of the multi function peripheral 1 as the job execution destination is received by the instruction reception section 2121 on this job execution destination selection screen 2503 through the mouse pointer operation or the like by the user (YES in SS4), the display controlling section 2122 reads the prohibition information stored for the designated multi function peripheral 1 from the prohibition information storage 241 (SS5). Then, the display controlling section 2122 causes the display 25 to display a job reception screen (SS6).

In SS6, the display controlling section 2122 causes functions indicated by the read prohibition information, i.e. the respective functions that was the target of the prohibition process when a job generated in the PC 31 was transmitted to the multi function peripheral 1 as the job execution destination in the past (e.g. the mixed document function and the page aggregate function so-called 2 in 1 setting, for example, when the multi function peripheral 1 stores the mixed document function and the page aggregate function so-called 2 in 1 setting as the target of the prohibition process in the prohibition setting) to be displayed in a manner different from other functions by a grey-out display or the like.

Figure 8:
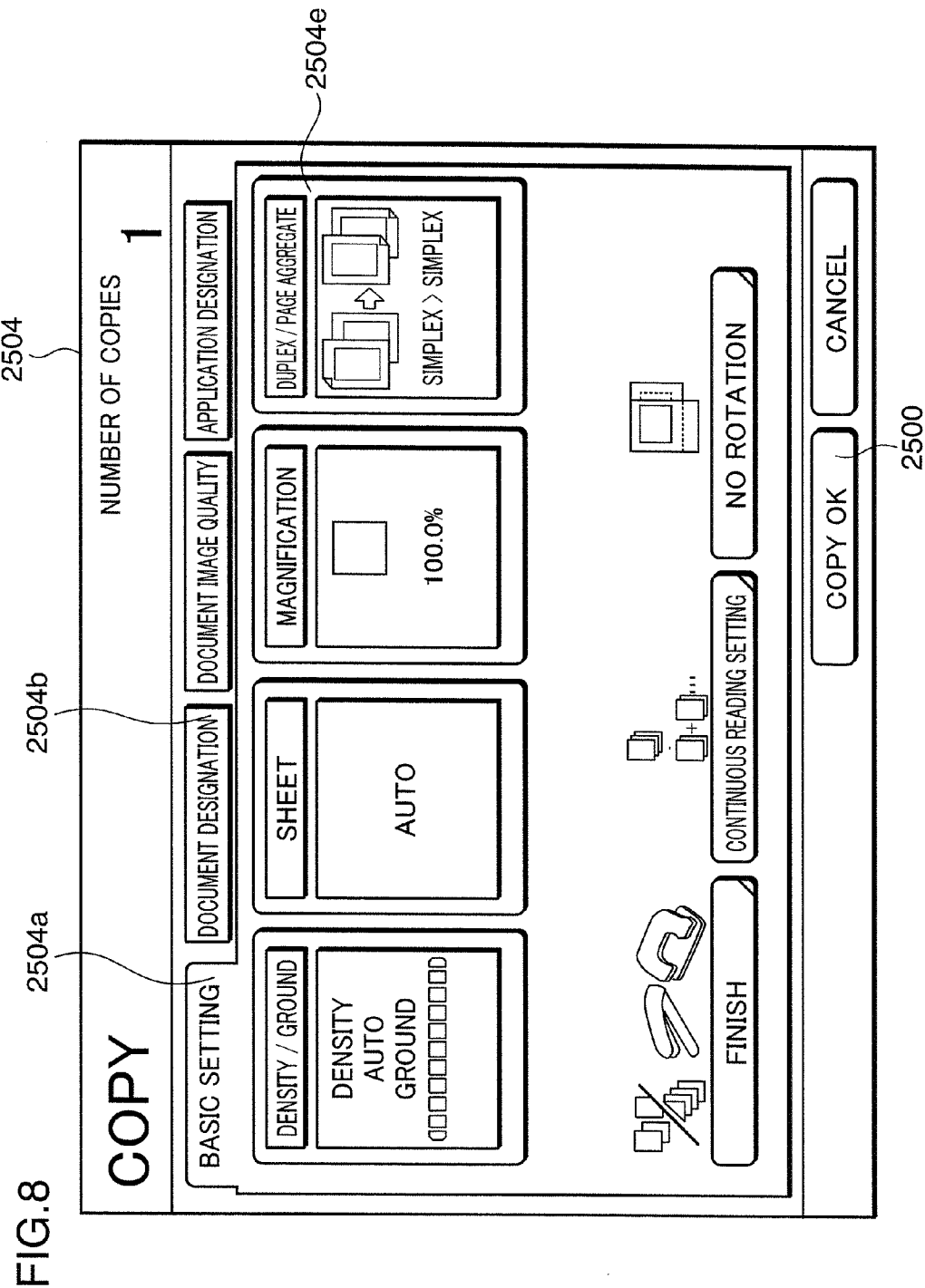
FIG. 8 is a diagram showing an example of a job reception screen.
Figure 9:
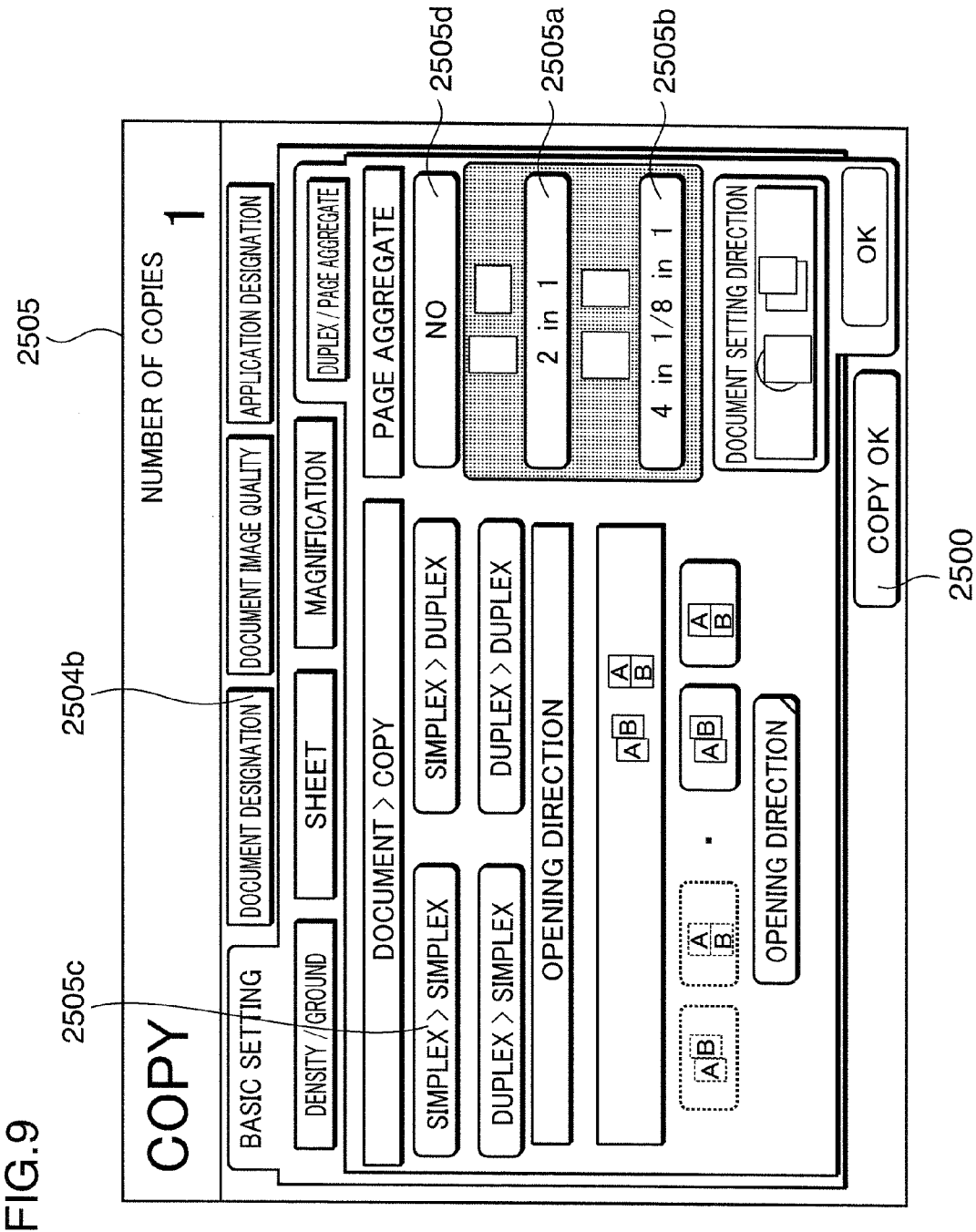
FIG. 9 is a diagram showing an example of a duplex/page aggregate screen.

There is described an exemplary case where a job generation instruction for a copying operation is input by the user. As shown in FIG. 8, tab images for receiving respective settings such as basic setting for the copying operation, document designation, document image quality and application setting are displayed on a job reception screen 2504 for receiving a copying operation job. On this job reception screen 2504, if the user clicks a tab image 2504a for basic setting through a mouse pointer operation or the like, a screen relating to settings of density, sheet, magnification and duplex printing/page aggregate is displayed. If the user clicks, for example, an image 2504e indicating duplex/page aggregate through a mouse pointer operation or the like, the display controlling section 2122 causes a display of a duplex/page aggregate screen 2505 for receiving detailed setting for duplex/page aggregate as an example is shown in FIG. 9. For example, if the mixed document function is already received by the instruction reception section 2121 when this duplex/page aggregate screen 2505 is displayed, the display controlling section 2122 causes images "2 in 1" 2505a and "4 in ⅛ in 1" 2505b for receiving the page aggregate function to be displayed differently from images indicating the other functions, e.g. in a grey-out display mode on the duplex/page aggregate screen 2505.

If the user designates any one of buttons of the duplex printing function ("SIMPLEX DOCUMENT>SIMPLEX RECORDING SHEET" button 2505c or the like) and any one of buttons of the page aggregate function ("NO" button 2505d or the like) through mouse pointer operations or the like on the duplex/page aggregate screen 2505, the functions corresponding to the buttons designated by the user are received by the instruction reception section 2121 of the job reception section 212.

Figure 10:
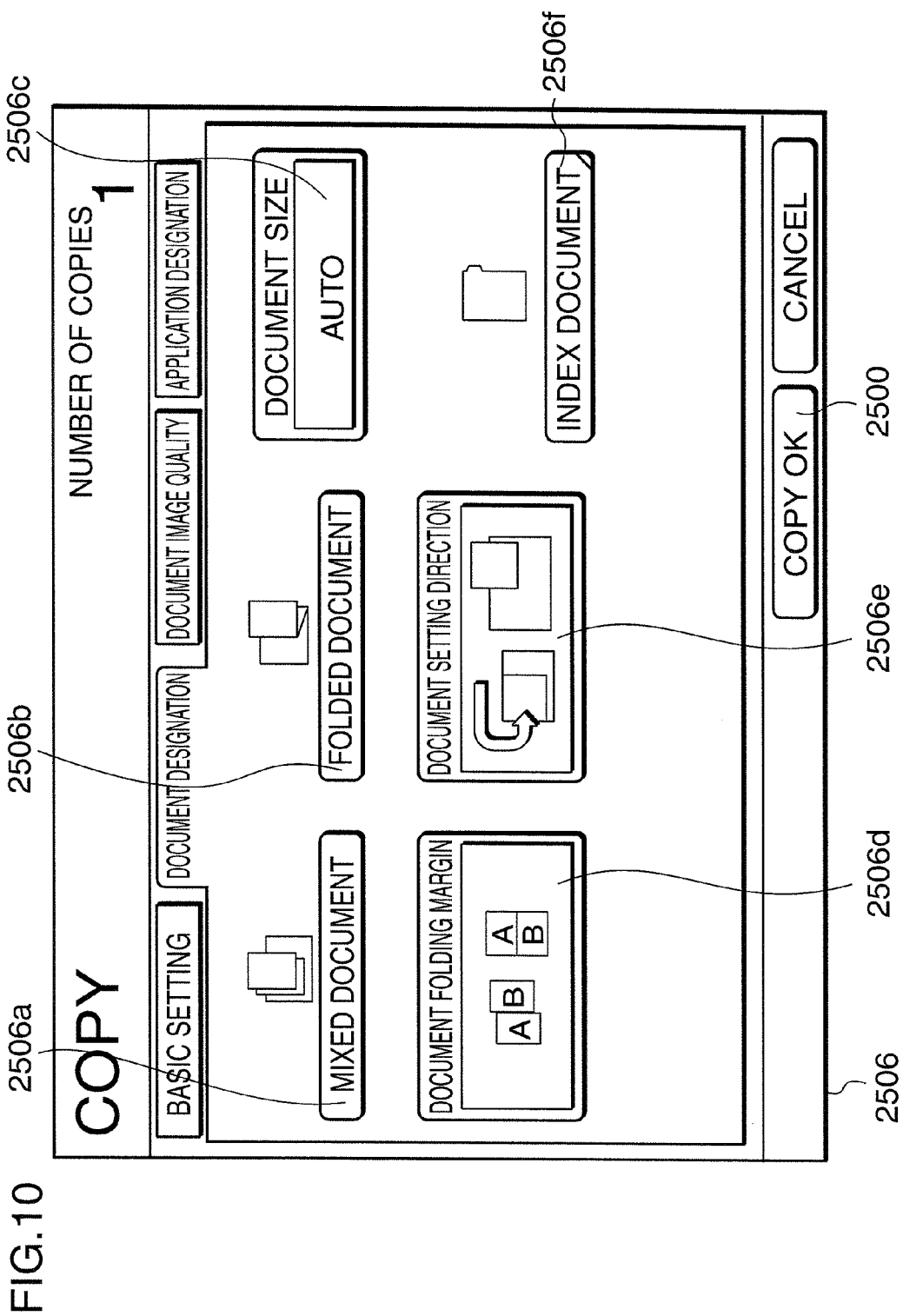
FIG. 10 is a diagram showing an example of a document designation screen.

Further, if the user designates a "DOCUMENT DESIGNATION" tab 2504b on the job reception screen 2504 or the duplex/page aggregate screen 2505 through a mouse pointer operation or the like, the display controlling section 2122 causes a display of a document designation screen 2506 as an example is shown in FIG. 10. A "MIXED DOCUMENT" button 2506a, a "FOLDED DOCUMENT" button 2506b, a "DOCUMENT SIZE" button 2507c, a "DOCUMENT BINDING MARGIN" button 2506d, a "DOCUMENT SETTING DIRECTION" button 2506e and an "INDEX IMAGE" button 2506f for receiving settings of respective functions such as "mixed document", "folded document", "document size", "document binding margin", "document setting direction" and "index document" are displayed on this document designation screen 2506 by the display controlling section 2122. For example, if the setting "2 in 1" is already received as the page aggregate function by the instruction reception section 2121 when this document designation screen 2506 is displayed, the display controlling section 2122 causes the "MIXED DOCUMENT" button 2506a for receiving the mixed document function to be displayed differently from images indicating the other functions, e.g. in a grey-out display mode on the document designation screen 2506.

As described above, when the user selects the respective desired functions through the mouse pointer operations or the like on the above respective screens (YES in SS7), the respective selected functions are received as functions as constituent elements of the job by the instruction reception section 2121 (SS8). When the completion of selection of the respective functions is received by the job transmitting section 2131 based on a click on a "COPY" button 2500 through a mouse pointer operation or the like on any one of the above respective screens after the user designates the desired functions in this way (YES in SS9), the job transmitting section 2131 transmits the job composed of the respective functions already selected at this point of time to the multi function peripheral 1 designated as the job execution destination in SS4 (SS10).

Although the display controlling section 2122 causes the respective functions as the target of the prohibition process to be displayed in the display mode different from the other functions (functions that are not the target of the prohibition process) in the multi function peripheral 1 in SS6, it may calculate for each of the functions, which can be constituent elements of jobs, whether or not a frequency of the function handled as the target of the prohibition process in the past (number of times at which the function was handled as the target of the prohibition process within a predetermined certain period (e.g. one week)) has reached a predetermined frequency (e.g. number of times at which the function was handled as the target of the prohibition process within the predetermined certain period has reached, for example, 10 times) for the respective functions, which can be constituent elements of jobs, based on the content indicated by the prohibition information received from the multi function peripheral 1 and cause the display 25 to display the functions having reached this frequency in a display mode different from the other functions.

[Second Embodiment]

A job management system 10 according to a second embodiment is similar to the first embodiment in the overall construction of image forming apparatuses, a server and computers. The job management system 10 according to the second embodiment is described below mainly on constructions different from the first embodiment.

Figure 11:
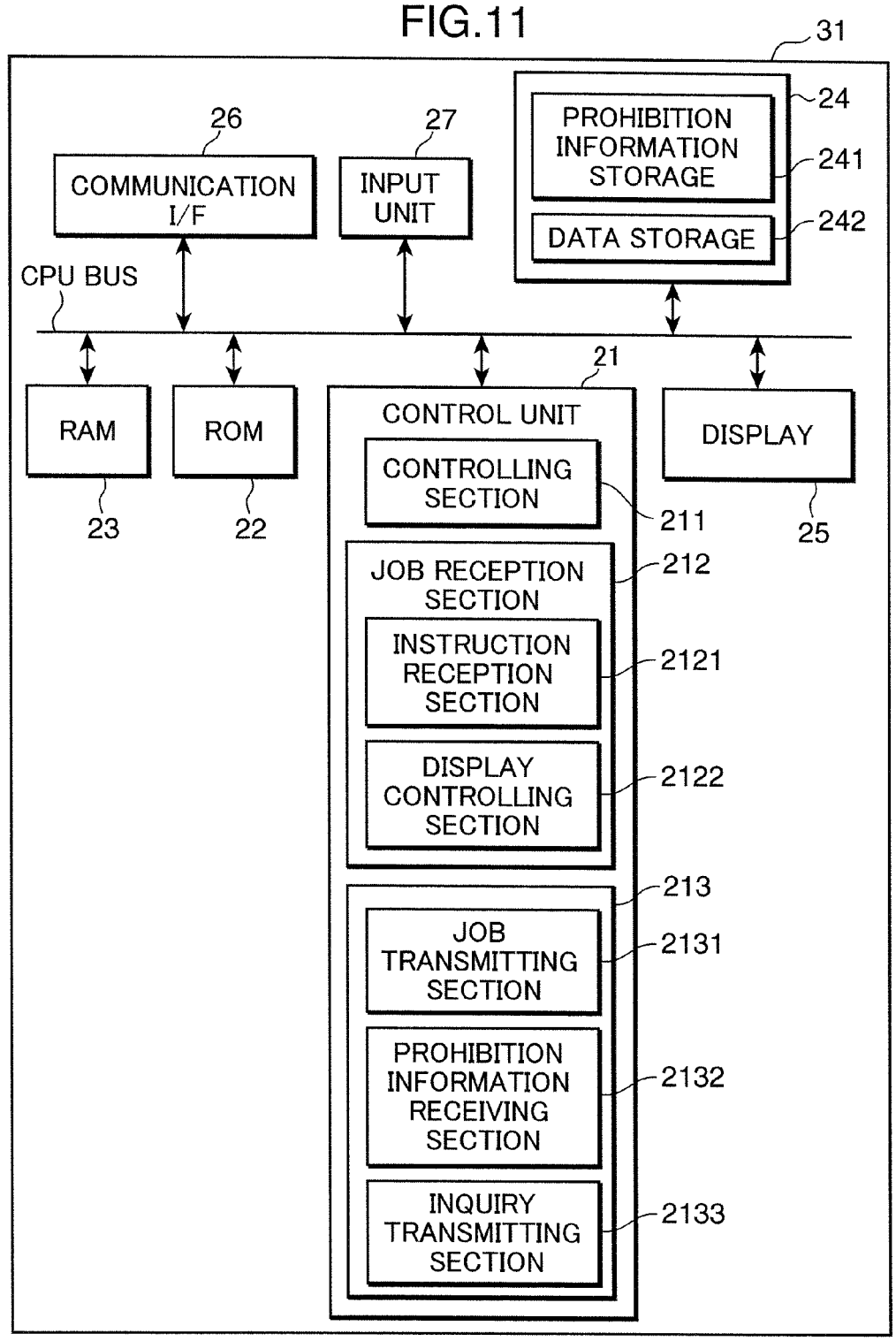
FIG. 11 is a block diagram schematically showing an internal construction of a PC in a job management system according to a second embodiment.

FIG. 11 is a block diagram schematically showing an internal construction of a PC 31 in the job management system 10 according to the second embodiment. Similar to the first embodiment, constructions necessary for a server SV2 and PCs 31 to 34 in the present invention are also similar in the second embodiment. Thus, the PC 31 is described below as an example. Further, unless otherwise mentioned, the construction of the PC 31 of the job management system 10 according to the second embodiment is similar to that of the PC 31 of the job management system 10 according to the first embodiment.

In the PC 31, a data transmitting/receiving section 213 of a control unit 21 includes an inquiry transmitting section 2133 for transmitting an inquiry request as to whether or not a job received from a user by a job reception section 212 is a target of a prohibition process in a multi function peripheral 1 (whether or not to violate prohibition setting) to the multi function peripheral 1.

A prohibition information receiving section 2132 receives prohibition information (information indicating whether or not a combination of a plurality of functions constituting the job as a target of the inquiry request is the target of the prohibition process in the multi function peripheral 1) from the multi function peripheral 1.

Further, a job transmitting section 2131 in this embodiment transmits the job received by the job reception section 212 to the multi function peripheral 1 when judging that the prohibition information received from the multi function peripheral 1 by the prohibition information receiving section 2132 indicates that the combination of the plurality of functions constituting the job as the target of the inquiry request is not the target of the prohibition process.

A job management program according to one embodiment of the present invention is stored in an HDD 24. The control unit 21 functions as the job reception section 212 and the data transmitting/receiving section 213 to be described later and further as a controlling section 211 for performing processings necessary for a job management process by these respective sections by operating in accordance with the job management program. The job management program according to one embodiment of the present invention is stored in a computer-readable storage medium, read from the storage medium and stored in the HDD 24 via an unillustrated interface. However, the constructions of the controlling section 211, the job reception section 212 and the data transmitting/receiving section 213 of the control unit 21 are not limited to these, and the controlling section 211, the job reception section 212 and the data transmitting/receiving section 213 may be respectively constructed by hardware circuits. In this second embodiment, the data transmitting/receiving section 213 also functions as the inquiry transmitting section 2133 by the job management program. This inquiry transmitting section 2133 may be constructed by a hardware circuit.

The multi function peripherals 1 of the job management system 10 according to the second embodiment are similar in construction to the multi function peripherals 1 of the job management system 10 according to the first embodiment. Thus, they are not shown in the drawing. A prohibition information transmitting section 1022 is for transmitting not only information indicating that a determination result by a prohibition determining section 101 indicates the target of the prohibition process (information indicating violation of the prohibition setting), but also the determination result by the prohibition determining section 101 as the prohibition information regardless of whether or not the determination result indicates the target of the prohibition process to the PC 31.

Figure 12:
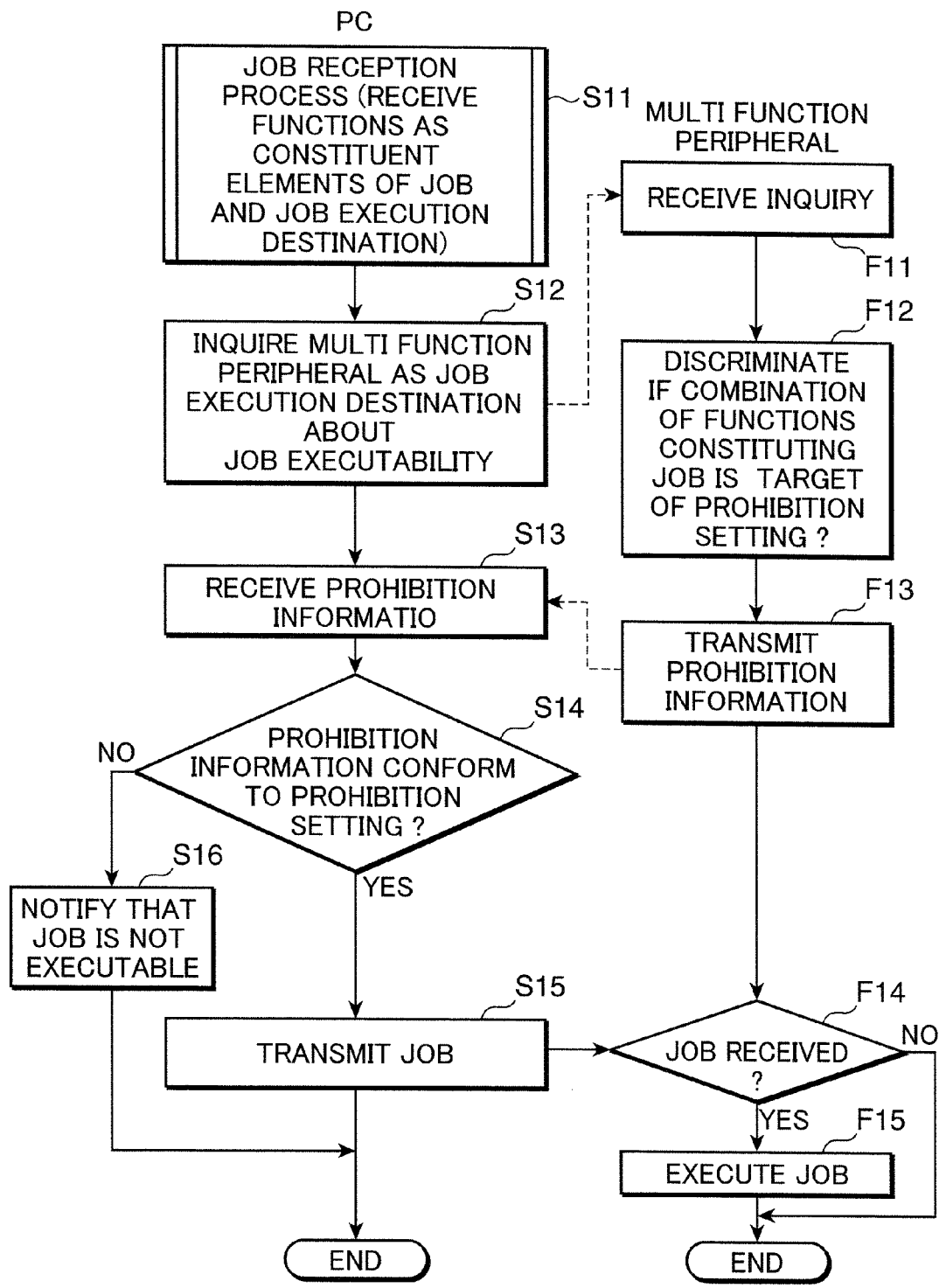
FIG. 12 is a flow chart showing a job management process by the job management system according to the second embodiment.

Next, the job management process by the job management system 10 according to the second embodiment is described. FIG. 12 is a flow chart showing the job management process by the job management system 10 according to the second embodiment.

In the job management system 10 according to the second embodiment, when the multi function peripheral 1 as a job execution destination and a job to be executed are received from a user by the job reception section 212 in the server SV2 or the PC 31 to 34 (S11), the inquiry transmitting section 2133 transmits an inquiry request as to whether or not the job received by the job reception section 212 violates the prohibition setting to the multi function peripheral 1 designated and entered as the job execution destination (S12).

When the above inquiry is received from the PC 31 by a job receiving section 1021 in the multi function peripheral 1 designated as the job execution destination in S12 (F11), the prohibition determining section 101 determines whether or not a combination of a plurality of functions constituting the job as the target of this inquiry is the target of the prohibition process (F12). The prohibition information transmitting section 1022 transmits the determination result by the prohibition determining section 101, i.e. the prohibition information indicating whether or not the combination of the plurality of functions constituting the job generated in the PC 31 is the target of the prohibition process (whether or not to violate the prohibition setting) to the PC 31, which transmitted the inquiry request (F13).

When the prohibition information receiving section 2132 receives the prohibition information from the multi function peripheral 1 in the PC 31 (S13), the job transmitting section 2131 analyzes the content of the received prohibition information and judges whether or not this prohibition information indicates that the combination of the plurality of functions constituting the job as the target of the above inquiry request is the target of the prohibition process (S14). The job transmitting section 2131 transmits the job to the multi function peripheral 1 designated as the job execution destination in S11 (S15) when the received prohibition information is judged not to indicate that the combination of the plurality of functions constituting the job as the target of the above inquiry request is the target of the prohibition process (YES in S14).

When the job receiving section 1021 receives the job transmitted from the PC 31 in the multi function peripheral 1 (YES in F14), the controlling section 103 executes the received job as the respective functions constituting this job are combined (F15). In other words, in the multi function peripheral 1, the controlling section 103 does not execute this job when the combination of the plurality of functions constituting the job as the target of the above inquiry are judged to be the target of the prohibition process by the prohibition determining section 101. Further, the controlling section 103 executes this job received from the PC 31 when the combination of the plurality of functions constituting the job as the target of the above inquiry are judged not to be the target of the prohibition process by the prohibition determining section 101.

On the other hand, when the job transmitting section 2131 judges that the received prohibition information indicates that the combination of the plurality of functions constituting the job as the target of the above inquiry are the target of the prohibition process (NO in S14), the display controlling section 2122 causes the display 25 to display an indication to the effect that the job received by the job reception section 212 in S11 is not executable in the multi function peripheral 1 designated as the execution destination in S11 (S16).

The above process can prevent a situation where the job composed of an inexecutable combination of functions is transmitted from the PC 31 to the multi function peripheral 1 and an operation different from a job set by a user in the PC 31 is performed in the multi function peripheral 1.

Figure 13:
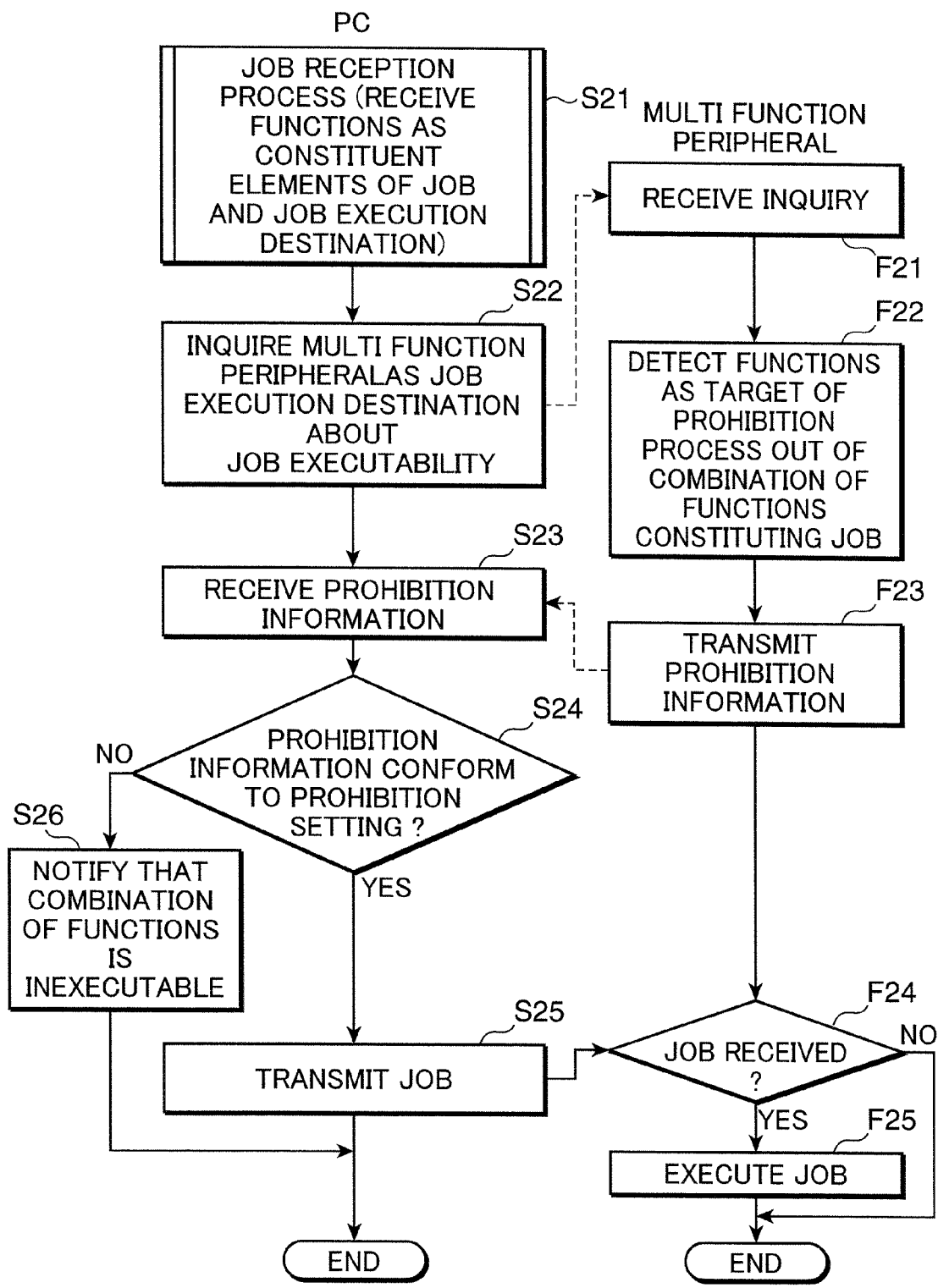
FIG. 13 is a flow chart showing another embodiment of the job management process by the job management system according to the second embodiment.
Figure 21:
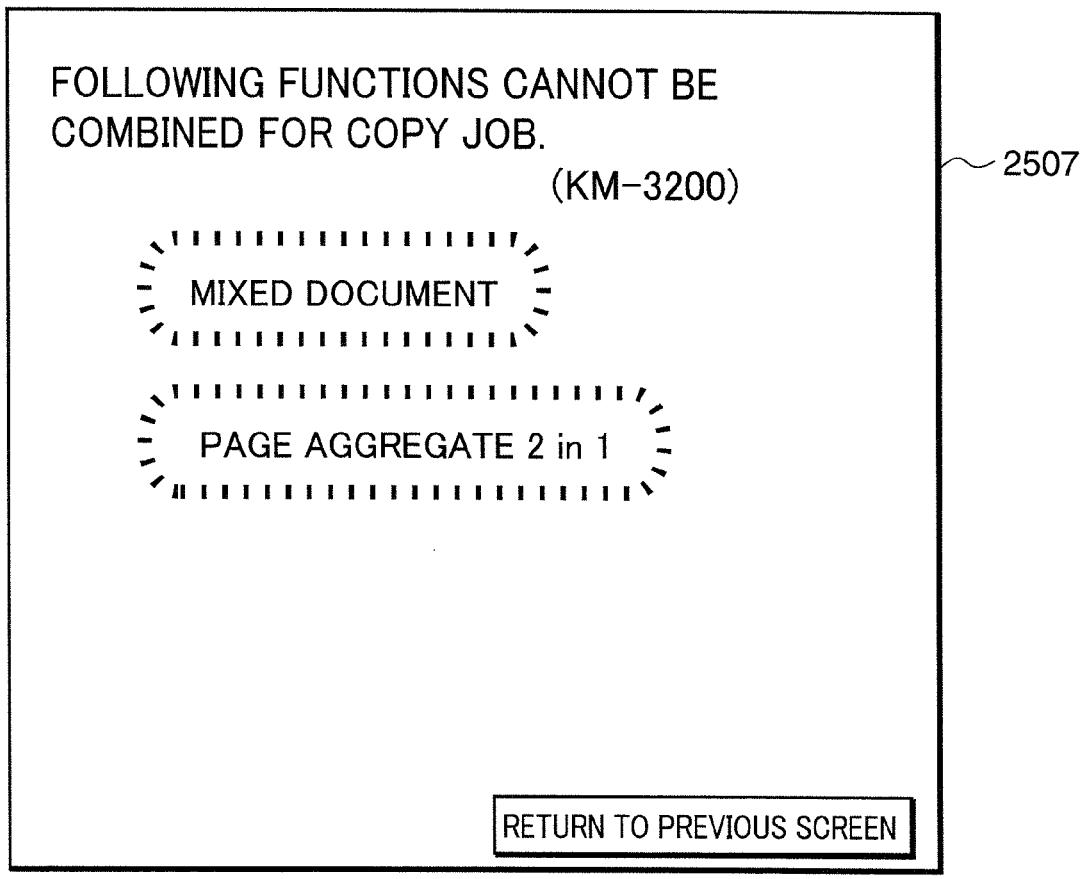
FIG. 21 is a diagram showing an example of a display screen.

Next, there is described another embodiment of the job management process by the job management system 10 according to the second embodiment. FIG. 13 is a flow chart showing the other embodiment of the job management process by the job management system 10 according to the second embodiment. Note that similar processings in the job management process shown in FIG. 12 are not described. FIG. 21 is a diagram showing an example of a display screen.

In this embodiment, when receiving the above inquiry from the PC 31 by the job receiving section 1021, the multi function peripheral 1 designated as a job execution destination in S21 determines whether or not the combination of the plurality of functions constituting the job as the target of the above inquiry is the target of the prohibition process and detects the functions as the target of the prohibition process when the combination is determined to be the target of the prohibition process (F22). For example, if the mixed document function and the 2 in 1 setting as the page aggregate function are stored in the prohibition setting as the target of the prohibition process, the mixed document function and the 2 in 1 setting as the page aggregate function are detected as the functions as the target of the prohibition process out of the combination of the plurality of functions constituting this job. The prohibition determining section 101 adds the thus detected functions as the target of the prohibition process (the mixed document function and the 2 in 1 setting as the page aggregate function in this example) to the prohibition information.

Then, the prohibition information transmitting section 1022 transmits the determination result by the prohibition determining section 101 and the above prohibition information to the PC 31, which transmitted the above inquiry request (F23).

When the prohibition information receiving section 2132 receives the prohibition information from the multi function peripheral 1 in the PC 31 (S23), the job transmitting section 2131 judges whether or not this prohibition information indicates that the combination of the plurality of functions constituting the job as the target of the inquiry is the target of the prohibition process (S24). The display controlling section 2122 causes the display 25 to display the functions as the target of the prohibition process indicated by the prohibition information, i.e. the mixed document function and the 2 in 1 setting as the page aggregate function in the above example in a blinking manner as shown in FIG. 21 (S26) when it is judged that the received prohibition information indicates that the combination of the plurality of functions constituting the job as the target of the above inquiry is the target of the prohibition process (NO in S24). Note that the display controlling section 2122 may also display the functions, which are not the target of the prohibition process indicated by the prohibition information, together with the functions as the target of the prohibition process indicated by the prohibition information in S26.

In this way, the user can grasp which of the functions constituting the job is the target of the prohibition process when the job generated by the PC 31 is not executable in the multi function peripheral 1. Therefore, the user can know how the job should be corrected to generate a job composed of a plurality of functions in conformity with the prohibition setting in the multi function peripheral 1 when the job generated by the user on the PC 31 cannot be executed in the multi function peripheral 1.

Figure 14:
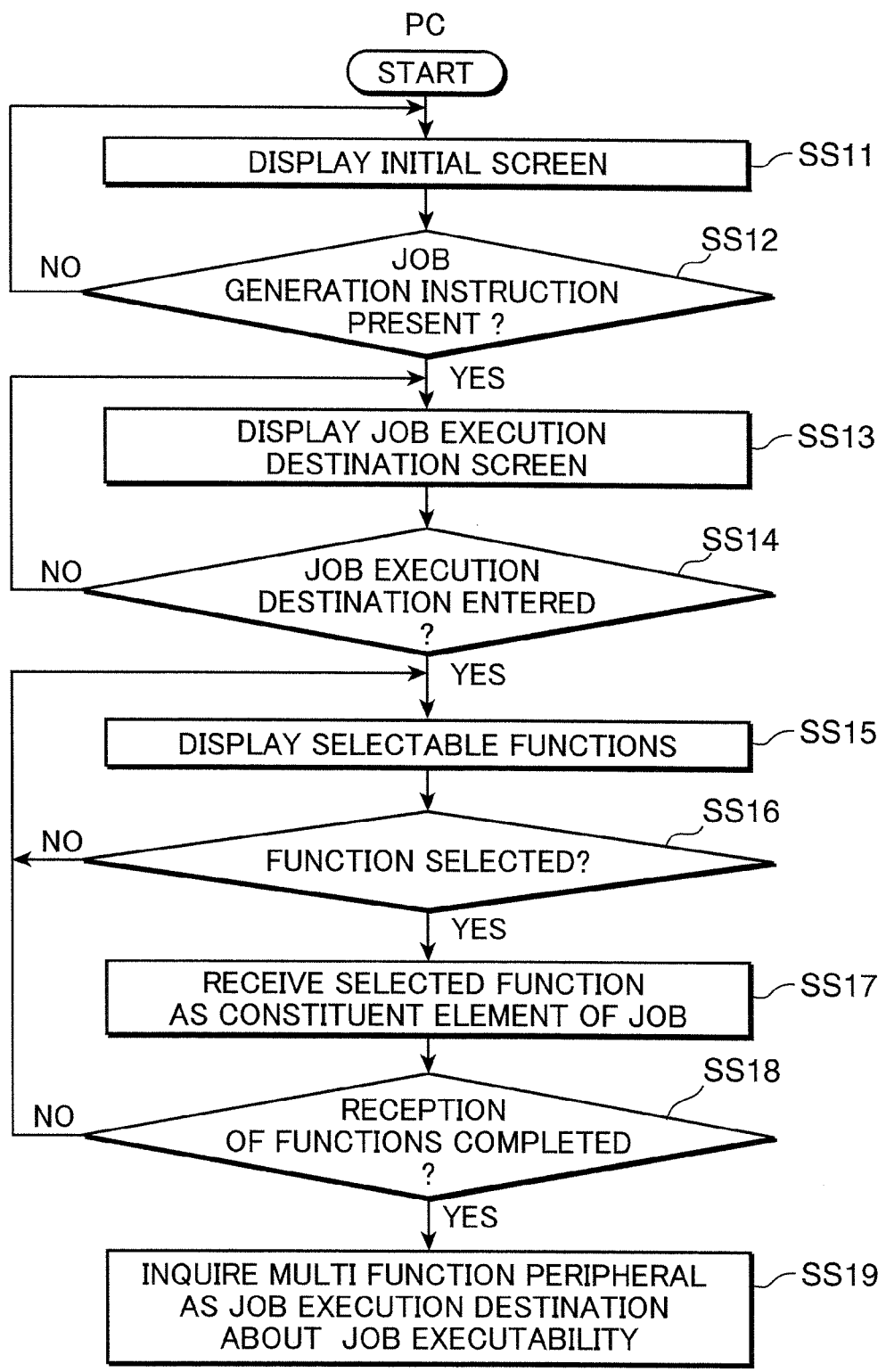
FIG. 14 is a flow chart showing a job entry reception process in the PC or the like of the job management system according to the second embodiment.

Next, there is described a job entry reception process in the PC 31 and the like of the job management system 10 according to the second embodiment. FIG. 14 is a flow chart showing the job entry reception process in the PC 31 and the like of the job management system 10 according to the second embodiment.

In the PC 31, when selection of the multi function peripheral 1 as a job execution destination is received by the instruction reception section 2121 through a mouse pointer operation or the like on a job execution destination selection screen 2503 by a user (YES in SS14), the display controlling section 2122 causes the display 25 to display a job reception screen 2501 (SS15).

When desired functions are selected through mouse pointer operations or the like on the above job reception screen by the user (e.g. job reception screen 2504 (in the case of a copying operation)) (YES in SS16), the respective selected functions are received as functions as constituent elements of a job by the instruction reception section 2121 (SS17). Then, when the completion of selection of the respective functions through the mouse pointer operations or the like on the job reception screen by the user is received by the job transmitting section 2131 (YES in SS18), the job entry reception process is completed.

Thereafter, the job transmitting section 2131 transmits an inquiry request as to whether or not the job received by the job reception section 212 violates the prohibition setting to the multi function peripheral 1 designated as the job execution destination in SS13 (SS19).

Figure 15:
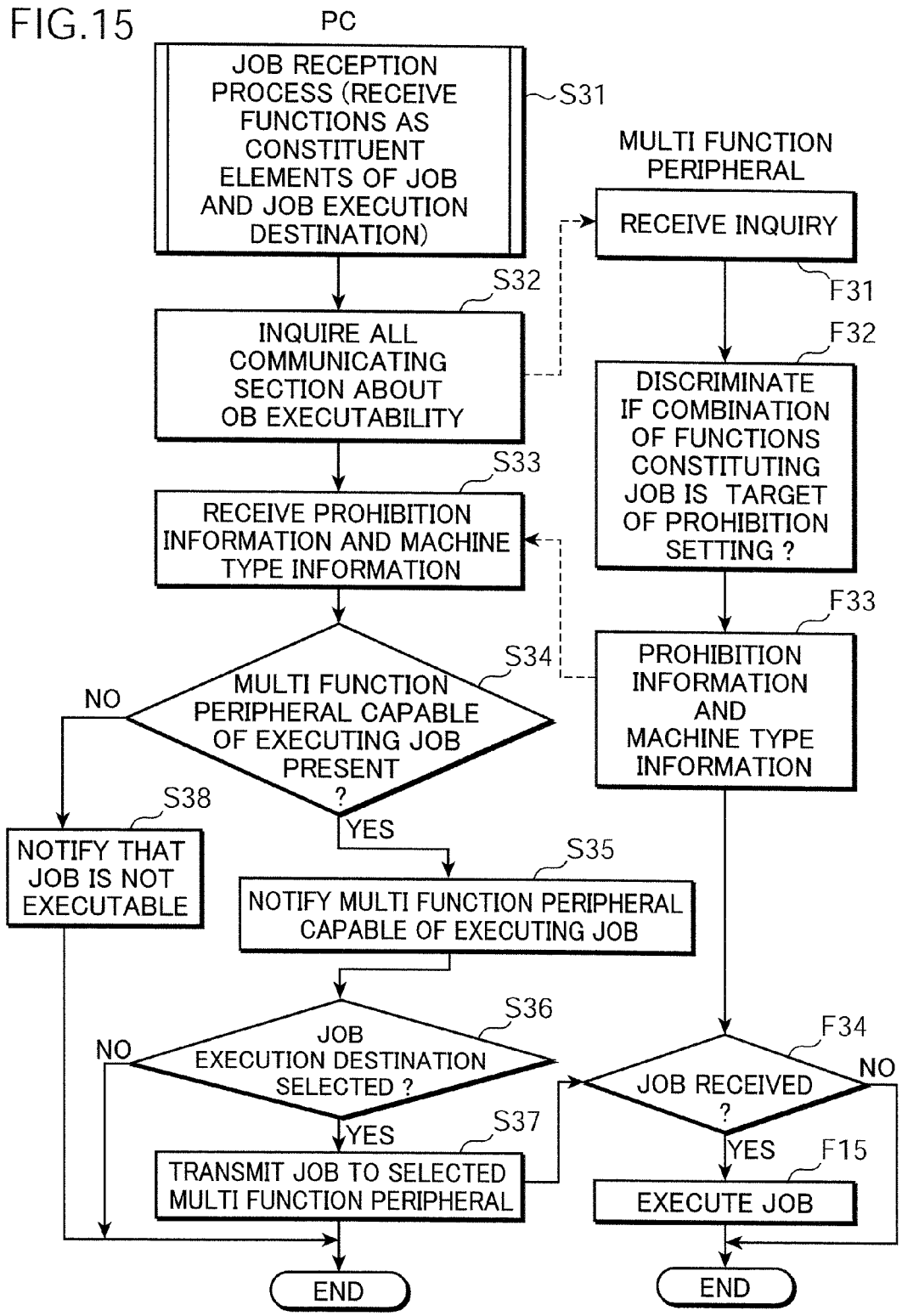
FIG. 15 is a flow chart showing another embodiment of the job management process by the job management system according to the second embodiment.

Next, another embodiment of the job management process by the job management system 10 according to the second embodiment is described. FIG. 15 is a flow chart showing the other embodiment of the job management process by the job management system 10 according to the second embodiment. Note that processings similar to those in the job management processes shown in FIGS. 12 and 13 are not described.

In this embodiment, when a job is received from a user in the PC 31 (S31), the inquiry transmitting section 2133 of the job transmitting section 2131 transmits an inquiry request as to whether or not the job received by the job reception section 212 violates the prohibition setting to all the multi function peripherals 1 provided in the job management system 10 (S32). In the job reception process in S31, designation of the multi function peripheral 1 as an execution destination of this job is not received.

In each of all the multi function peripherals 1 provided in the job management system 10, when the job receiving section 1021 receives the above inquiry from the PC 31 (F31), the prohibition determining section 101 determines whether or not a combination of a plurality of functions constituting the job as a target of the above inquiry is a target of the prohibition process (F32). Then, the prohibition information transmitting section 1022 of each multi function peripheral 1 transmits prohibition information indicating the determination result by the prohibition determining section 101 and machine type information of the multi function peripheral 1 itself to the PC 31, which transmitted the above inquiry request (F33).

When the prohibition information receiving section 2132 receives the prohibition information and the machine type information from all the multi function peripherals 1 in the PC 31 (S33), the job transmitting section 2131 judges whether or not the prohibition information from each multi function peripheral 1 indicates that the combination of the plurality of functions constituting the job as the target of the inquiry conforms to the prohibition setting based on the machine type information (S34).

When the job transmitting section 2131 judges that the received prohibition information from each of all the multi function peripherals 1 indicates that the combination of the plurality of functions constituting the job as the target of the inquiry is the target of the prohibition process (NO in S34), the display controlling section 2122 causes the display 25 to display an indication to the effect that the job received by the job reception section 212 in S31 is inexecutable in all the multi function peripherals 1 provided in the job management system 10 (S38).

Figure 16:
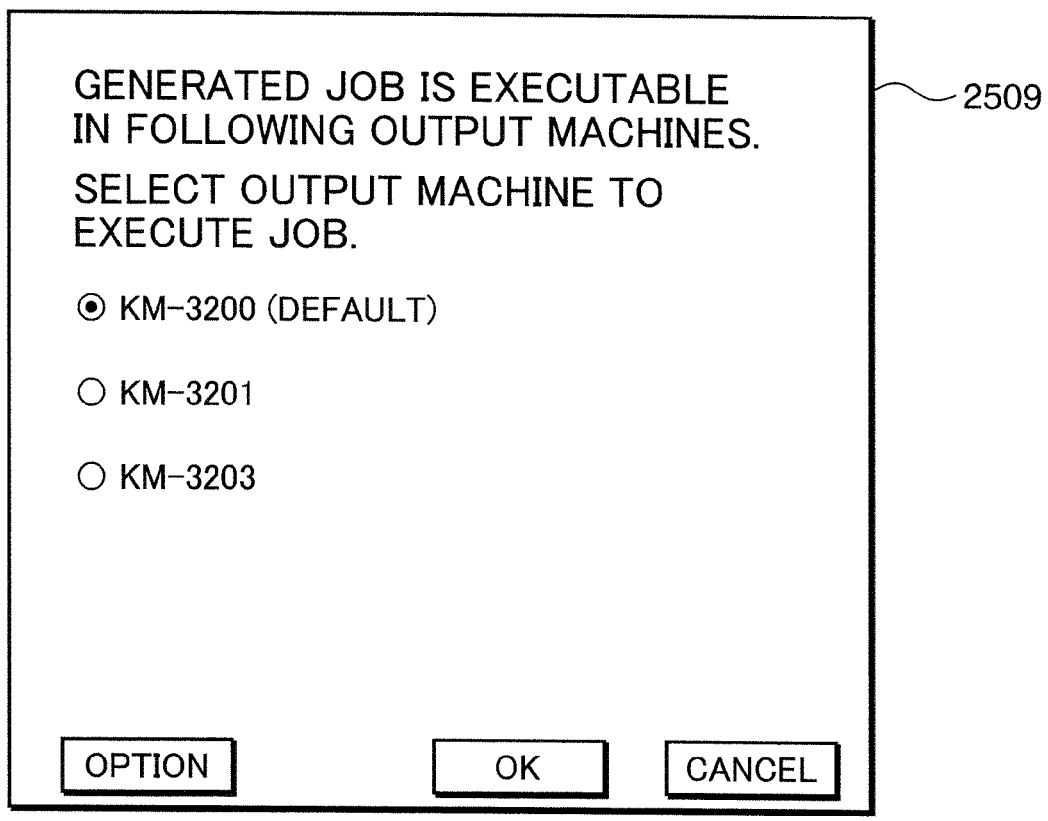
FIG. 16 is a diagram showing an example of a display screen.

On the other hand, when any of the received pieces of the prohibition information is judged by the job transmitting section 2131 to indicate that the combination of the plurality of functions constituting the job is not the target of the inquiry (YES in S34), i.e. when the job management system 10 includes the multi function peripheral 1 that can execute the combination of the plurality of functions constituting the job received by the job reception section 212 in S31, a display screen 2509 indicating the names (or machine numbers) of the multi function peripherals 1 that can execute this job is displayed on the display 25, for example, as shown in FIG. 16(S35).

Here, an instruction to select the multi function peripheral 1 as an execution destination of the job input to the job reception section 212 in S31 is received by the instruction reception section 2121 based on the display in S35 (YES in S36), the job transmitting section 2131 transmits the job input to the job reception section 212 to the multi function peripheral 1 selected by the user (S37). If the instruction to select the multi function peripheral as the execution destination of the job input to the job reception section 212 in S31 is not received from the user by the instruction reception section 2121 (NO in S36), the job transmitting section 2131 ends the process without transmitting the job input to the job reception section 212 in S31 to any of the multi function peripherals 1 (NO in S36).

In the multi function peripheral 1 having received the above job from the PC 31 by the job receiving section 1021 (YES in F34) out of the multi function peripherals 1 provided in the job management system 10, the controlling section 103 executes the received job (F35). In the multi function peripherals 1 that is included in the job management system 10 and did not receive the above job from the PC 31 (NO in F34), the process is ended without executing the received job.

[Third Embodiment]

A job management system 10 according to a third embodiment is similar to the first embodiment in the overall construction of image forming apparatuses, a server and computers. The job management system 10 according to the third embodiment is described below mainly on constructions different from the first embodiment.

Figure 17:
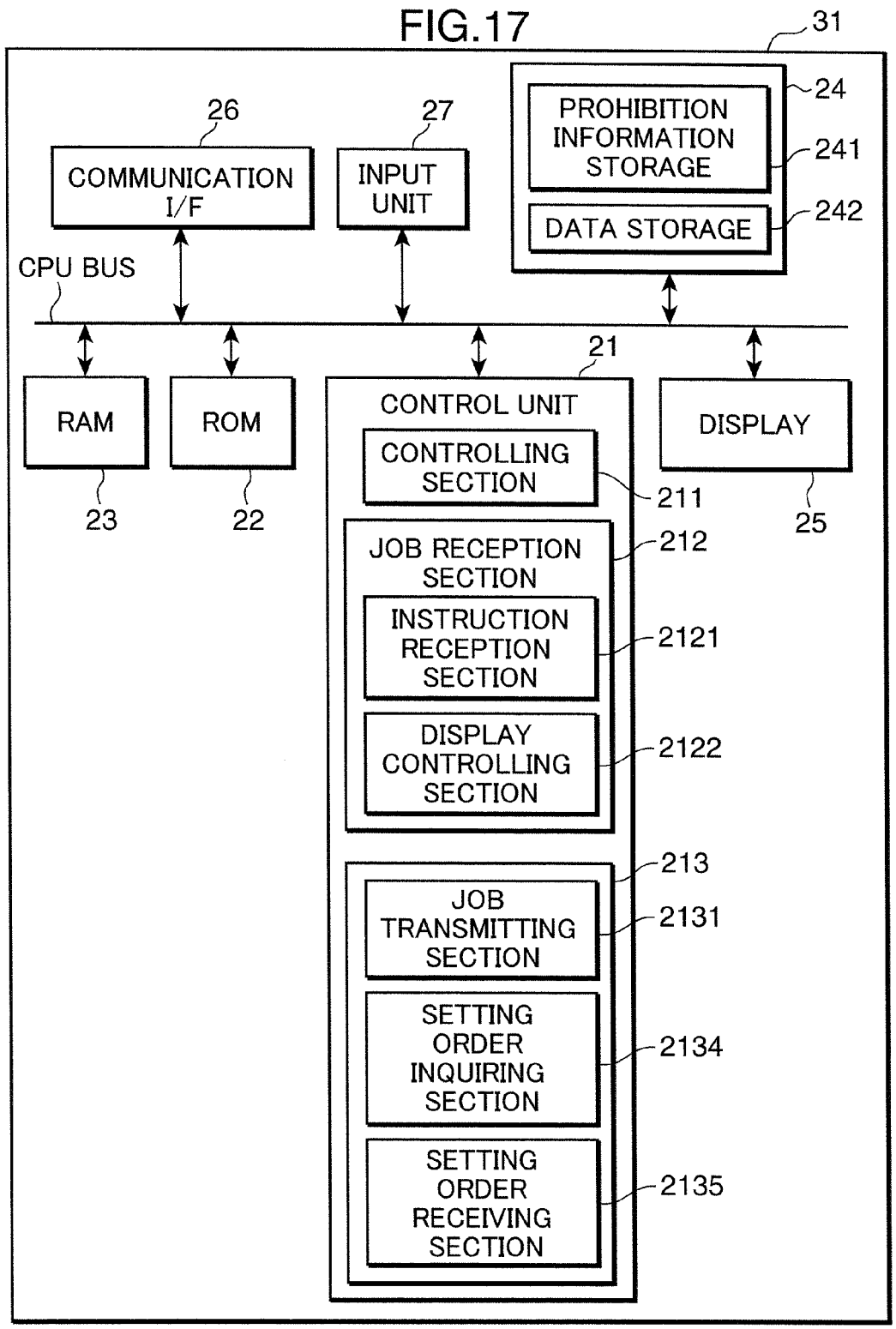
FIG. 17 is a block diagram schematically showing an internal construction of a PC in a job management system according to a third embodiment.

FIG. 17 is a block diagram schematically showing an internal construction of a PC 31 in the job management system 10 according to the third embodiment. Similar to the first embodiment, constructions necessary for a server SV2 and PCs 31 to 34 in the present invention are also similar in the third embodiment. Thus, the PC 31 is described below as an example. Further, unless otherwise mentioned, the construction of the PC 31 of the job management system 10 according to the third embodiment is similar to that of the PC 31 of the job management system 10 according to the first embodiment.

In a control unit 21 of the PC 31, a data transmitting/receiving section 213 further includes a setting order inquiring section 2134 and a setting order receiving section 2135.

The setting order inquiring section 2134 requests transmission of setting order information indicating an order of setting a combination of a plurality of functions constituting a job to a multi function peripheral 1. This setting order indicates a predetermined function setting order in which a plurality of functions can be combined without being a target of a prohibition process when the job is generated.

The setting order receiving section 2135 receives the above setting order from the multi function peripheral 1.

A job management program according to one embodiment of the present invention is stored in an HDD 24. The control unit 21 functions as a job reception section 212 and the data transmitting/receiving section 213 to be described later and further as a controlling section 211 for performing processings necessary for a job management process by these respective sections by operating in accordance with the job management program. The job management program according to one embodiment of the present invention is stored in a computer-readable storage medium, read from the storage medium and stored in the HDD 24 via an unillustrated interface. However, the constructions of the controlling section 211, the job reception section 212 and the data transmitting/receiving section 213 of the control unit 21 are not limited to these, and the controlling section 211, the job reception section 212 and the data transmitting/receiving section 213 may be respectively constructed by hardware circuits. In this third embodiment, the data transmitting/receiving section 213 also functions as the setting order inquiring section 2134 and the setting order receiving section 2135 by the job management program. These setting order inquiring section 2134 and setting order receiving section 2135 may be constructed by hardware circuits.

Figure 18:
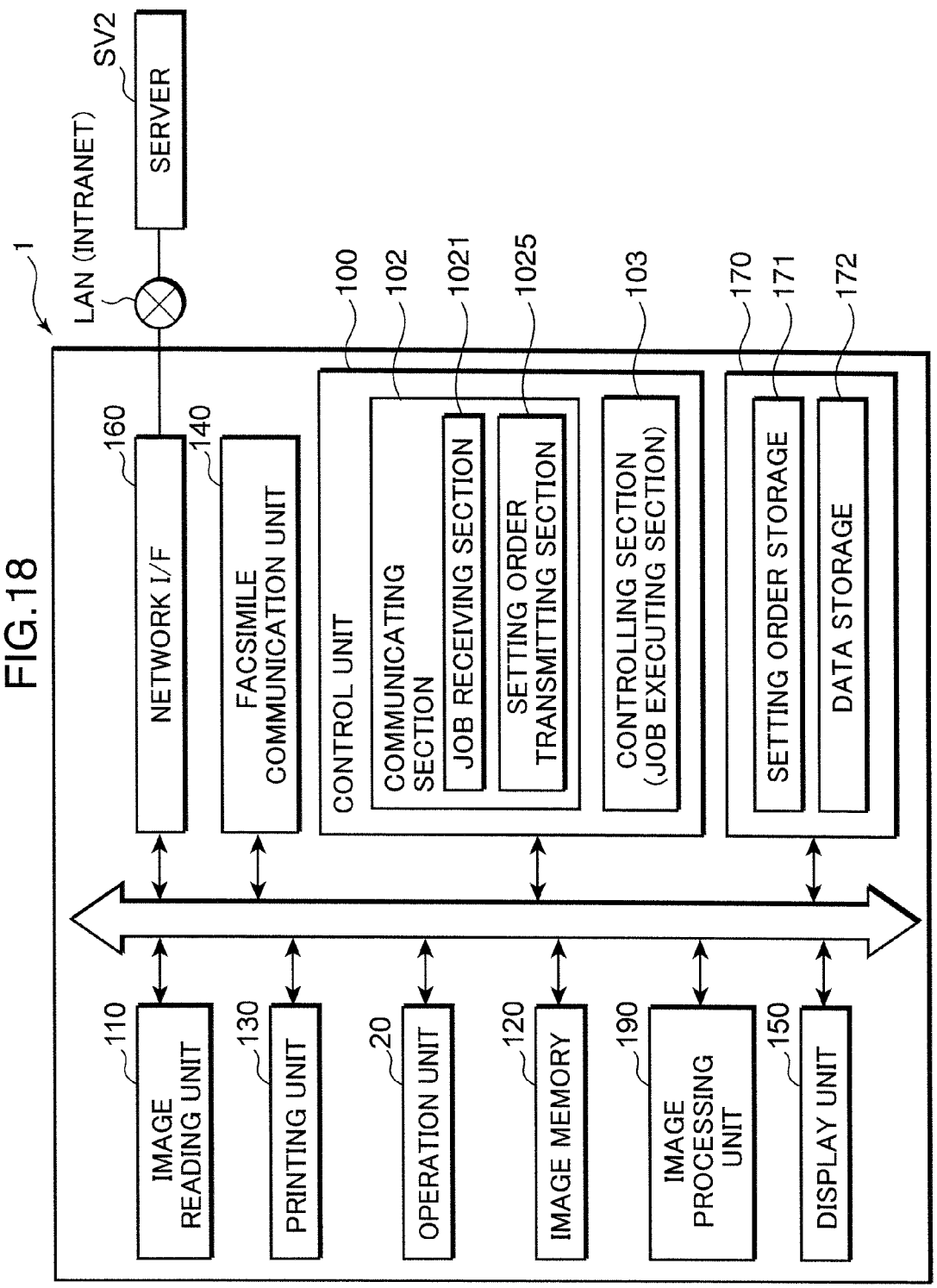
FIG. 18 is a diagram showing a construction of a multi function peripheral of the job management system according to the third embodiment.

A construction of each multi function peripheral 1 of the job management system 10 according to the third embodiment is shown in FIG. 18. Unless otherwise mentioned, the construction of the multi function peripheral 1 of the job management system 10 according to the third embodiment is similar to that of the multi function peripheral 1 of the job management system 10 according to the first embodiment.

In the multi function peripheral 1 of the job management system 10 according to the third embodiment, a control unit (information processing unit) 100 includes no prohibition determining section 101 and a communicating section 102 includes a setting order transmitting section 1025 in place of the prohibition information transmitting section 1022 of the first embodiment. Further, an HDD 24 includes a setting order storage 171.

The setting order storage 171 stores a predetermined setting order for combination of a plurality of functions to constitute each job executable in the multi function peripheral 1, i.e. a predetermined order of setting functions executable by a computer that combines a plurality of functions while avoiding the functions becoming a target of a prohibition process upon generating a job. A setting operation order of (1) document size, (2) document setting, (3) document reading resolution, (4) file format, (5) color/black and white printing and (6) other settings is stored as this predetermined setting order when the respective functions constituting a job are document size, document setting, document reading resolution, file format, color/black and white printing, etc., for example, in the case of a job for a copying operation. This is merely an example and it is not intended to limit the predetermined setting order to this.

For the job indicated by the setting order transmission request received by a job receiving section 1021, the setting order transmitting section 1025 reads the above setting order of the job from the setting order storage 171 and transmits the read setting order to the PC 31.

The job management program according to one embodiment of the present invention is stored in the HDD 24. The control unit 100 functions as the communicating section 102 and further as a controlling section 103 for performing processings necessary for the job management process by these respective sections by operating in accordance with this job management program. The job management program according to one embodiment of the present invention is stored in a computer-readable storage medium, read from this storage medium and stored in the HDD 24 via an unillustrated interface. However, the constructions of the communicating section 102 and the controlling section 103 of the control unit 100 are not limited to these, and the communicating section 102 and the controlling section 103 may be respectively constructed by hardware circuits. In this third embodiment, the communicating section 102 functions as the job receiving section 1021 and the setting order transmitting section 1025 by the job management program. Further, these job receiving section 1021 and setting order transmitting section 1025 may be constructed by hardware circuits.

Figure 19:
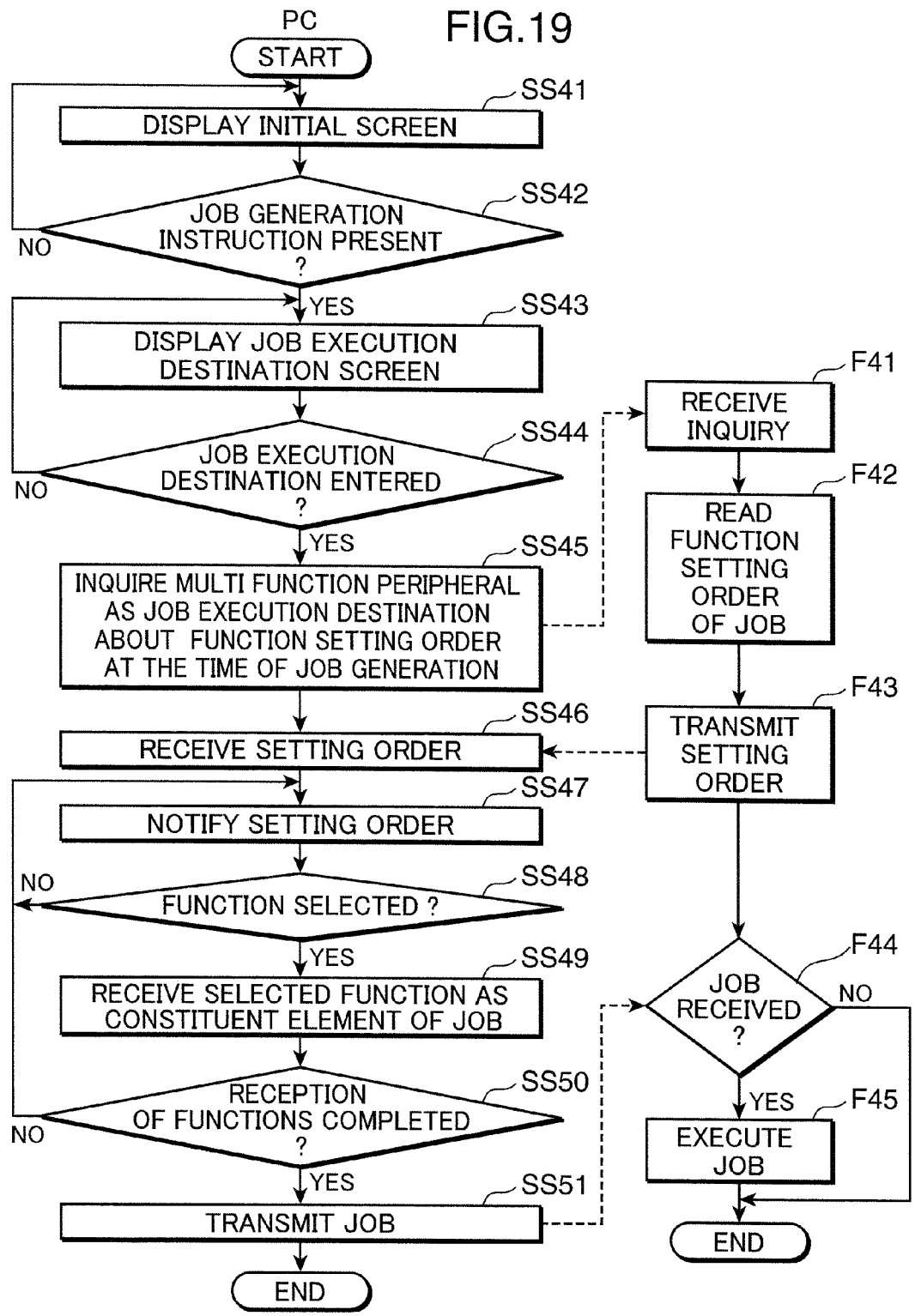
FIG. 19 is a flow chart showing a job management process by the job management system.

Next, a job entry reception process and the job management process by the job management system 10 according to the third embodiment are described. FIG. 19 is a flow chart showing the job management process by the job management system 10.

In the job management system 10 according to the third embodiment, when an instruction to start a driver of the multi function peripheral 1 is input through the operation of an input unit 27 by a user in the PC 31, a display controlling section 2122 causes a display 25 to display a driver initial screen (e.g. driver initial screen 2501 shown in FIGS. 6A and 6B) (SS41). When the user selects a display part of a desired operation on this driver initial screen 2501 and a job generation instruction for the selected operation is received by the display controlling section 2122 (YES in SS42), the display controlling section 2122 causes the display 25 to display a job execution destination selection screen 2503 (see, for example, FIG. 7) (SS43).

When selection of the multi function peripheral 1 as the job execution destination is received by an instruction reception section 2121 through a mouse pointer operation or the like on this job execution destination selection screen 2503 by the user (YES in SS44), the setting order inquiring section 2134 requests transmission of the above setting order information to the multi function peripheral 1 (SS45). In other words, the setting order inquiring section 2134 inquires the multi function peripheral 1 about the above setting order.

When the multi function peripheral 1 as the job execution destination receives the request of the setting order information from the PC 31 by the job receiving section 1021 (F41), the setting order transmitting section 1025 reads the setting order of the job from the setting order storage 171 for the job indicated by the setting order transmission request received by the job receiving section 1021 (F42) and transmits the read setting order to the PC 31, which requested the setting order information (F43).

Figure 20:
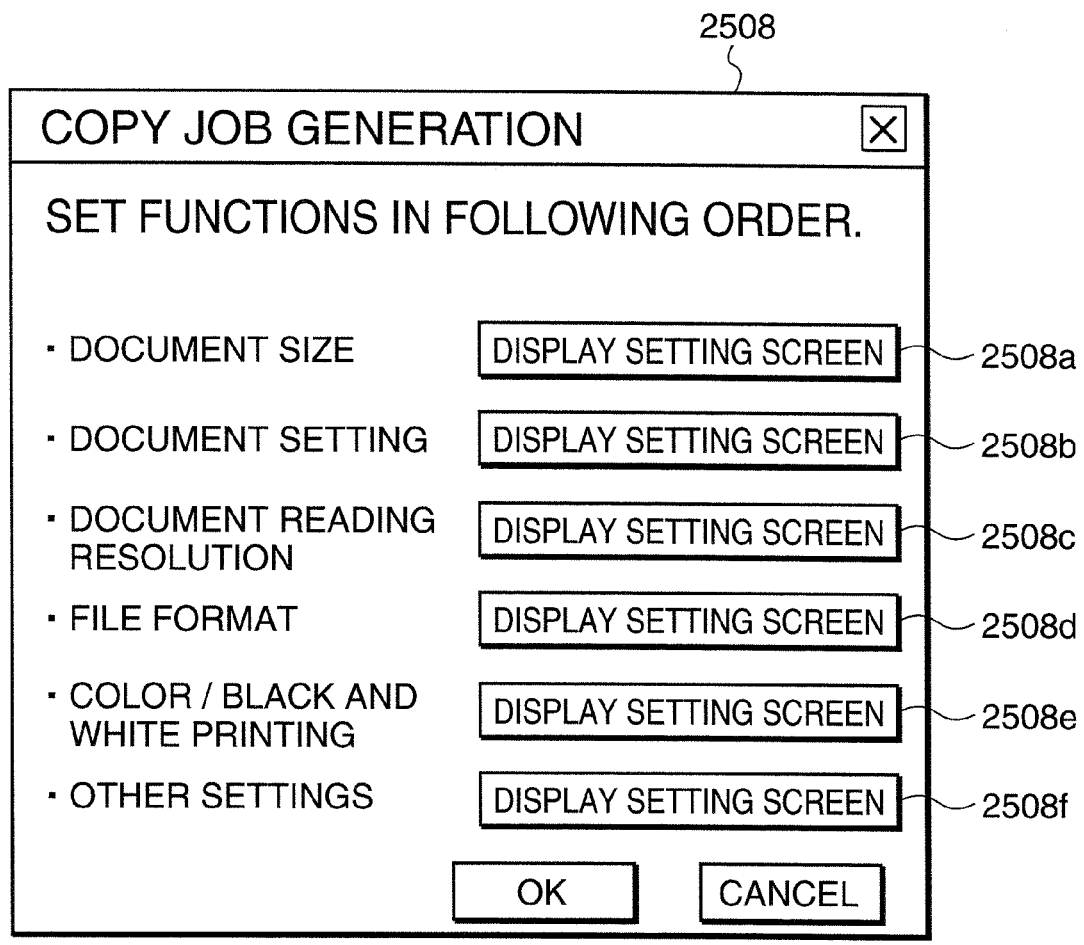
FIG. 20 is a diagram showing an example of a setting order guiding screen.

When the PC 31, which requested the setting order information, receives the setting order from the multi function peripheral 1 (SS46), the display controlling section 2122 causes the display 25 to display the setting order (SS47). For example, as on a setting order guide screen 2508 shown in FIG. 20, the display controlling section 2122 causes a display of a setting order judged not to be prohibited in the multi function peripheral 1 with settings (1) document size, (2) document setting, (3) document reading resolution, (4) file format, (5) color/black and white printing and (6) other settings in an increasing order indicated by numbers from top or causes the setting operation order to be so displayed as to easily understandable to the user by assigning numbers to the respective settings in accordance with the contents of the setting order when the respective functions constituting a job for a copying operation are, for example, document size, document setting, document reading resolution, file format, color/black and white printing, etc.

When the user clicks any one of "DISPLAY SETTING SCREEN" button 2508*a* to 2508*e* through a mouse pointer operation on the setting order guide screen 2508, the display controlling section 2122 causes a display of a job reception screen corresponding to the designated "DISPLAY SETTING SCREEN" button 2508*a* to 2508*e*. When the user selects desired functions through mouse pointer operations or the like on each job reception screen (YES in SS48), the respective selected functions are received as functions as constituent elements of the job by the instruction reception section 2121 (SS49). When the user clicks a "COPY" button 2500 (see FIG. 8, etc.) on each job reception screen through a mouse pointer operation or the like after designating the desired functions, the completion of selection of the respective functions is received by the job transmitting section 2131 (YES in SS50) and the job transmitting section 2131 transmits the job composed of the respective functions already selected at this point of time to the multi function peripheral 1 designated as the job execution destination in SS44 (SS51).

In this way, the user can grasp in which order the user should designate the respective functions to accurately generate the job, i.e. to avoid becoming the target of the prohibition process in the multi function peripheral 1 at the time of job generation in the PC 31. Thus, operability at the time of job generation is improved. Further, it can be prevented that an operation different from the job generated in the PC 31 by the user is performed in the multi function peripheral 1.

In the processing in SS51, the job transmitting section 2131 may judge whether or not the respective functions have been received from the user in the setting order by the job reception section 212 and transmit the job received by the job reception section 212 to the multi function peripheral 1 only if the respective functions were received in the setting order.

In this case, it can be further reliably prevented that an operation different from the job generated in the PC 31 by the user is performed in the multi function peripheral 1.

The present invention is not limited to the constructions of the above embodiments and can be variously modified. For example, the constructions and processes according to the above embodiments shown in FIGS. 1 to 21 are merely examples of the constructions and processes of the job management system, job management program, prohibition determination process, computers, electric apparatuses and image forming apparatuses according to the present invention and do not limit the constructions and processes of the job management system, job management program, prohibition determination process, computers, electric apparatuses and image forming apparatuses according to the present invention to the contents described above.

Although the electric apparatuses according to the present invention are image forming apparatuses such as the multi function peripherals 1 in the above respective embodiments, they are not limited to these and may be any electric apparatuses which are connected to a computer and whose operations are controlled in accordance with a job transmitted from the computer, e.g. image forming apparatuses other than multi function peripherals (copiers, facsimile machines, printers, etc.). Further, application to every electric apparatus such as a personal computer, a mobile phone, a microwave or a washing machine is possible.

For example, a conventional image forming apparatus merely displays functions, which cannot be combined at the time of job setting, to a user when the user sets a job by operating an operation panel of the image forming apparatus. Thus, this technology by the above conventional image forming apparatus cannot deal with a case where a job to be executed in the image forming apparatus is generated in a computer such as an external server and transmitted from the computer to the image forming apparatus via a Web service to be executed.

In contrast, according to the present invention, in the case where a job to be executed in an image forming apparatus or electric apparatus is generated in a computer such as an external server and the computer causes the electric apparatus such as an image forming apparatus to execute this job via a Web service, the computer can let a user operating this computer grasp functions, which can be combined at the time of job setting, utilizing prohibition information transmitted from the image forming apparatus or electric apparatus.

In the above invention, the user can set the job after recognizing functions with a high frequency of being a target of a prohibition process when a display controlling section of the computer causes a display unit to display functions, whose prohibition frequencies calculated by a prohibition frequency calculating section have reached a predetermined frequency, in a different display mode. This can prevent a situation where a job composed of the functions that are the target of the prohibition process is transmitted to the electric apparatus and an operation different from the one desired by the user is performed in the electric apparatus.

In the above invention, when the display controlling section of the computer causes the display unit to display functions indicated by the prohibition information stored in a prohibition information storage, i.e. a combination of functions as the target of the prohibition process in a different display mode, the user operating this computer can easily grasp functions that cannot be combined at the time of job setting.

In the above invention, when a prohibition information transmitting section of the electric apparatus transmits apparatus type information of the electric apparatus to the computer together with the prohibition information, the apparatus type information of the electric apparatus is stored together with the prohibition information in the prohibition information storage of the computer. Thus, according to this invention, the computer can let the user operating this computer grasp the functions that cannot be combined at the time of job generation for each type of the electric apparatus. For example, generally, high-performance apparatuses have more executable jobs than low-performance apparatuses and have fewer functions, which are a target of a prohibition process, out of functions constituting each job. Thus, it becomes possible to let a user grasp functions, which cannot be combined at the time of job generation, according to the type of an electric apparatus in a computer connected to a plurality of types of electric apparatuses.

In the above invention, the prohibition information transmitting section transmits the prohibition information indicating a determination result to the computer when a prohibition determining section determines that a combination of a plurality of functions indicated by a job received by a job receiving section is a target of a prohibition process in an electric apparatus or an image forming apparatus. This can prevent a situation where, when a job to be executed in an electric apparatus such as an image is generated in the computer such as an external server and the computer causes the electric apparatus such as the image forming apparatus to execute this job via a Web service, a job composed of an inexecutable combination of functions is transmitted from the computer to the electric apparatus or the image forming apparatus and an operation different from the job set in the computer by the user is performed in the electric apparatus or the image forming apparatus.

In the above invention, when the job reception section receives job setting composed of a combination of a plurality of functions from a user in the computer, an inquiry transmitting section transmits an inquiry request as to whether or not the received job is executable to the electric apparatus, and a job transmitting section transmits the job received by the job reception section to the electric apparatus if the prohibition information received by a prohibition information receiving section does not indicate the target of the prohibition process. This can avoid transmission of a job composed of an inexecutable combination of functions from the computer to the electric apparatus and prevent a situation where an operation different from the job set in the computer by the user is performed in the electric apparatus when a job to be executed in the electric apparatus such as an image forming apparatus is generated in the computer such as an external server and the computer causes the electric apparatus such as the image forming apparatus to execute this job via a Web service.

In the above invention, a notifying section of the computer notifies that the job is inexecutable when the combination of the plurality of functions constituting the job as a target of the inquiry request is determined to be the target of the prohibition process based on the prohibition information. Thus, it becomes possible to let the user operating this computer grasp that the set job cannot be accurately executed in the electric apparatus.

In the above invention, when a plurality of functions are combined by a user to a set a job in the computer, the inquiry transmitting section of the computer transmits an inquiry request to each electric apparatus and the notifying section of the computer notifies the electric apparatus(es) capable of executing the job received by the job reception section based on the prohibition information and the apparatus type information received from each electric apparatus by the prohibition information receiving section. Thus, it becomes possible to let the user setting the job in the computer grasp the electric apparatus(es) capable of executing the job set by the user.

In the above invention, after notification of the electric apparatus(es) capable of the job by the notifying section, the job transmitting section transmits the job received by the job reception section to the electric apparatus indicated by a designation instruction received by a designation instruction reception section. Thus, the job set in the computer by the user can be transmitted to the electric apparatus capable of executing this job so as to be reliably executed by this electric apparatus.

In the above invention, a job to be executed in an electric apparatus such as an image forming apparatus is generated in a computer such as an external server and the computer causes the electric apparatus such as the image forming apparatus to execute the job via a Web service. This can prevent a situation where a job composed of an inexecutable combination of functions is transmitted from the computer to the electric apparatus and an operation different from the job set in the computer by the user is performed in this electric apparatus.

In the above invention, in the electric apparatus, a setting order transmitting section reads a setting order for a job indicated by a setting order transmission request received from the computer by a communicating section and transmits the read setting order to the computer. Thus, the user can be guided as to how to generate an accurate job composed of functions, which are not the target of the prohibition process in the electric apparatus, in the computer based on the setting order transmitted from the electric apparatus. Therefore, operability at the time of job setting can be improved.

In the above invention, the job reception section judges whether or not the respective functions were received in the setting order from the user and the job transmitting section transmits the job received by the job reception section to the electric apparatus if the respective functions were received in the setting order. Thus, the respective functions constituting the job as set in the computer by the user can be accurately performed in the electric apparatus without being the target of the prohibition process.

In the above invention, in the computer, a setting order inquiring section requests transmission of setting order information indicating an order of setting a combination of a plurality of functions constituting a job to the electric apparatus, a setting order receiving section receives the setting order for combining the plurality of functions to constitute the job from the electric apparatus and the notifying section notifies this setting order. Thus, the user can grasp how to generate an accurate job composed of functions, which are not the target of the prohibition process in the electric apparatus, in the computer when a job to be executed in the electric apparatus such as an image forming apparatus is generated in the computer such as an external server and the computer causes the electric apparatus such as the image forming apparatus to execute this job via a Web service. Therefore, operability at the time of job setting is improved.

In the above invention, the setting order inquiring section requests transmission of setting order information indicating an order of setting a combination of a plurality of functions constituting a job to the electric apparatus. In the electric apparatus, the setting order transmitting section reads the setting order for the job indicated by the setting order transmission request received by the communicating section and transmits the read setting order to the computer. In the computer, the notifying section notifies the setting order received by the setting order receiving section. Thus, the user can grasp how to generate an accurate job composed of functions, which are not the target of the prohibition process in the electric apparatus, in the computer when a job to be executed in the electric apparatus such as an image forming apparatus is generated in the computer such as an external server and the computer causes the electric apparatus such as the image forming apparatus to execute this job via a Web service. Therefore, operability at the time of job setting is improved.

This application is based on Japanese Patent application serial Nos. 2009-272789, 2009-272790 and 2009-272791 filed in Japan Patent Office on Nov. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A non-transitory computer-readable storage medium storing a job management program for causing a computer capable of ordering an electric apparatus selected by a user from among a plurality of electric apparatuses to execute a job to function as:

a job reception section for receiving setting of the job composed of a combination of a plurality of functions from the user;

a job transmitting section for transmitting the job, the setting of which was received by the job reception section, to the electric apparatus selected by the user from the plurality of electric apparatuses as a job execution destination;

a prohibition information receiving section for receiving prohibition information indicating that the combination of the plurality of functions indicated by the job is a target of a prohibition process from the electric apparatus selected by the user as the job execution destination;

a prohibition information storage for storing the prohibition information received by the prohibition information receiving section an instruction reception section for receiving the selection of the electric apparatus as the job execution destination from among the plurality of electric apparatuses; and a display controlling section for causing a display unit of the computer to display a selection screen on which the electric apparatus as the job execution destination can be selected from among the plurality of electric apparatuses, and for reading the prohibition information of the selected electric apparatus from the prohibition information storage when the selection of the electric apparatus as the job destination has been received by the instruction reception section via the selection screen and for causing the display unit to display the prohibition information, wherein the job management program further causes the computer to function such that:

the display controlling section causes the display unit to display a selection button of a function indicated by the prohibition information stored in the prohibition information storage in a display mode different from selection buttons of the other functions;

the prohibition information receiving section receives the prohibition information and apparatus type information of the electric apparatus from the electric apparatus; and the display controlling section causes the selection button of the function indicated by the prohibition information stored in the prohibition information storage to be displayed in the different display mode based on the apparatus type information for each type of the electric apparatus.

2. A non-transitory computer-readable storage medium storing a job management program according to claim 1, wherein the job management program further causes the computer to function such that:

the display controlling section causes the display unit of the computer to display guidance prompting the user to enter a combination of a plurality of functions;

the instruction reception section receives a combination of a plurality of functions constituting a job from the user through operations based on the guidance displayed on the display unit;

the job reception section functions as a prohibition frequency calculating section for calculating a prohibition frequency at which the functions received by the instruction reception section are indicated by the prohibition information; and the display controlling section causes the display unit to display the function, whose prohibition frequency calculated by the prohibition frequency calculating section has reached a predetermined frequency, in the different display mode.

3. A job management system, comprising a plurality of electric apparatuses and a computer connected to the plurality of electric apparatuses, the computer being capable of ordering one of the electric apparatuses selected by a user from among the plurality of electric apparatuses to execute a job, wherein:

the computer includes a job reception section for receiving setting of the job composed of a combination of a plurality of functions from the user and a job transmitting section for transmitting the job, the setting of which was received by the job reception section, to the electric apparatus selected by the user from the plurality of electric apparatuses as a job execution destination;

the electric apparatus includes a job receiving section for receiving a job transmitted from the computer, a prohibition determining section for determining whether or not the combination of a plurality of functions constituting the job received by the job receiving section is a target of a prohibition process stored beforehand, a job executing section for executing the received job, and a prohibition information transmitting section for transmitting prohibition information indicating that the combination of the plurality of functions constituting the job is the target of the prohibition process to the computer when the combination of the plurality of functions constituting the received job is determined to be the target of the prohibition process; and the computer further includes a prohibition information receiving section for receiving the prohibition information from the electric apparatus selected by the user as the job execution destination, a prohibition information storage for storing the prohibition information received by the prohibition information receiving section, an instruction reception section for receiving the selection of the electric apparatus as the job execution destination from among the plurality of electric apparatuses, and a display controlling section for causing a display unit of the computer to display a selection screen on which the electric apparatus, as the job execution destination, can be selected from among the plurality of electric apparatuses, for reading the prohibition information of the selected electric apparatus from the prohibition information storage when the selection of the electric apparatus as the job destination has been received by the instruction reception section via the selection screen and causing the display unit to display the prohibition information, whereby, among jobs each composed of a combination of a plurality of functions and whose executions have been ordered by the computer in the past to the selected apparatus, the combination of the plurality of functions that has been determined as the target of the prohibition process is displayed as the prohibition information.

4. A job management system, comprising a computer and an electric apparatus connected to the computer, wherein:

the computer includes
a job reception section for receiving a job execution instruction composed of a combination of a plurality of functions from a user, and
an inquiry transmitting section for transmitting to the electric apparatus an inquiry request as to whether or not the job received by the job reception section is executable;

the electric apparatus includes
a communicating section for receiving the inquiry request,
a prohibition determining section for determining whether or not the combination of the plurality of functions constituting the job as a target of the inquiry request received by the communicating section is a target of a prohibition process stored beforehand, and
a prohibition information transmitting section for transmitting prohibition information indicating a determination result by the prohibition determining section to the computer;

the computer further includes
a prohibition information receiving section for receiving the prohibition information from the electric apparatus,
a job transmitting section for transmitting the job received by the job reception section to the electric apparatus when the prohibition information received by the prohibition information receiving section indicates that the combination of the plurality of functions constituting the job as the target of the inquiry request is not the target of the prohibition, and
a notifying section for notifying that the job is inexecutable when the prohibition information indicates that the combination of the plurality of functions constituting the job as the target of the inquiry request is the target of the prohibition process;

the prohibition determining section of the electric apparatus, in addition to determining whether or not the combination of the plurality of functions constituting the job as the target of the inquiry request is the target of the prohibition process, detects functions as the target of the prohibition process from the plurality of functions, and the prohibition information transmitting section transmits, as the prohibition information, the functions detected by the prohibition determining section and the determination result to the computer; and the notifying section of the computer notifies the combination of the functions that cannot be combined based on the functions indicated by the prohibition information received by the prohibition information receiving section.

5. A non-transitory computer-readable storage medium storing a job management program for causing a computer capable of ordering an electric apparatus selected by a user from among a plurality of electric apparatuses to execute a job to function as:

a first reception section for receiving a generation instruction of the job;

an instruction reception section for receiving, after the generation instruction of the job has been received by the first reception section, the selection of the electric apparatus that is to execute the job from the plurality of electric apparatuses;

a setting order inquiring section for requesting, when the selection has been received by the instruction reception section, transmission of setting order information to the selected electric apparatus indicating a setting order of a plurality of functions necessary to execute the job in an order starting from a function that should be set first;

a setting order receiving section for receiving the setting order transmitted from the selected electric apparatus in response to the inquiry;

a display controlling section for causing a display unit of the computer to display a setting order guide screen that guides the setting order of the plurality of functions indicated by the setting order received by the setting order receiving section;

a job reception section for receiving an input of setting a combination of the plurality of functions constituting the job from the user according to the setting order shown by the setting order guide screen in the order starting from the function that should be set first; and a job transmitting section for transmitting the job received by the job reception section to the electric apparatus.

6. A non-transitory computer-readable storage medium storing a job management program according to claim 5, wherein the job management program causes the computer to function such that:

the job transmitting section judges whether or not the respective functions were received from the user in the setting order by the job reception section and transmits the job received by the job reception section to the electric apparatus if the respective functions were received in the setting order.

7. A job management system, comprising a plurality of electric apparatuses and a computer connected to the plurality of electric apparatuses, the computer being capable of ordering one of the electric apparatuses selected by a user from among the plurality of electric apparatuses to execute a job, wherein:

the computer includes a first reception section for receiving a generation instruction for receiving a generation instruction of the job, an instruction reception section for receiving, after the generation instruction of the job has been received by the first reception section, the selection of the electric apparatus that is to execute the job from among the plurality of electric apparatuses, and a setting order inquiring section for requesting, when the selection has been received by the instruction reception section, transmission of setting order information to the selected electric apparatus indicating a setting order of a plurality of functions necessary to execute the job in an order starting from a function that should be set first;

the electric apparatus includes a communicating section for performing data communication with the computer, a job executing section for executing a job received from the computer by the communicating section, a setting order storage for storing a predetermined setting order when a plurality of functions are combined to constitute each job executable in the electric apparatus, and a setting order transmitting section for reading the setting order for a job indicated by a setting order transmission request received by the communicating section from the setting order storage and transmitting the read setting order to the computer; and the computer further includes a setting order receiving section for receiving the setting order transmitted from the selected electric apparatus, a display controlling section for causing a display unit of the computer to display a setting order guide screen that guides the setting order of the plurality of functions indicated by the setting order received by the setting order receiving section, a job reception section for receiving an input of setting a combination of the plurality of functions constituting the job from a user according to the setting order shown by the setting order guide screen in the order starting from the function that should be set first, and a job transmitting section for transmitting the job received by the job reception section to the electric apparatus.

\* \* \* \* \*